US012050630B2

(12) United States Patent
Gonzalez et al.

(10) Patent No.: US 12,050,630 B2
(45) Date of Patent: *Jul. 30, 2024

(54) METHOD, SYSTEM, AND APPARATUS FOR RAPID GEOGRAPHIC SEARCH IN AN ACTOR-BASED GEOGRAPHIC SEARCH NETWORK

(71) Applicant: Bytedance, Inc., Wilmington, DE (US)

(72) Inventors: Matias Sebastian Gonzalez, Dublin (IE); Thiago Ferreira Costa, Palo Alto, CA (US); Antonio Bastardo, San Jose, CA (US); Alvaro Viloria, Palo Alto, CA (US)

(73) Assignee: Bytedance Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 18/112,801

(22) Filed: Feb. 22, 2023

(65) Prior Publication Data

US 2023/0350924 A1 Nov. 2, 2023

Related U.S. Application Data

(63) Continuation of application No. 17/316,190, filed on May 10, 2021, now Pat. No. 11,615,123, which is a continuation of application No. 16/502,729, filed on Jul. 3, 2019, now Pat. No. 11,036,772.

(60) Provisional application No. 62/694,333, filed on Jul. 5, 2018.

(51) Int. Cl.
*G06F 16/29* (2019.01)
*G06F 16/9535* (2019.01)
*G06F 16/9537* (2019.01)

(52) U.S. Cl.
CPC .......... *G06F 16/29* (2019.01); *G06F 16/9535* (2019.01); *G06F 16/9537* (2019.01)

(58) Field of Classification Search
CPC . G01C 21/3679; G06F 16/29; G06F 16/9535; H04W 4/029
USPC ....................................................... 707/770
See application file for complete search history.

(56) References Cited

U.S. PATENT DOCUMENTS

| | | | |
|---|---|---|---|
| 8,046,371 B2 | 10/2011 | O'Clair et al. | |
| 8,060,606 B2* | 11/2011 | Friedman | H04L 67/303 709/224 |
| 8,069,165 B2 | 11/2011 | Vechersky | |
| 8,902,085 B1* | 12/2014 | Ray | F41H 11/02 340/963 |
| 2003/0061211 A1 | 3/2003 | Shultz et al. | |
| 2003/0087646 A1 | 5/2003 | Funato et al. | |
| 2009/0070293 A1* | 3/2009 | Vechersky | G06F 16/29 |
| 2009/0210388 A1 | 8/2009 | Elson et al. | |
| 2010/0145947 A1 | 6/2010 | Kolman et al. | |
| 2013/0328941 A1 | 12/2013 | Carbonneau et al. | |
| 2014/0053099 A1* | 2/2014 | Groten | G01C 21/3644 715/790 |

(Continued)

OTHER PUBLICATIONS

Fine-resolution Population mapping using OpenstreetMap Points-of-interst, Mohamed Bakillah et al., Mar. 18, 2014.*

(Continued)

*Primary Examiner* — Hung T Vy
(74) *Attorney, Agent, or Firm* — Alston & Bird LLP

(57) ABSTRACT

Embodiments of the present disclosure provide methods, systems, and apparatuses for rapid geographic search in an actor-based geographic search network.

20 Claims, 10 Drawing Sheets

(56) References Cited

U.S. PATENT DOCUMENTS

2016/0342678 A1* 11/2016 Newman ............... G06Q 10/06
2018/0089227 A1* 3/2018 Reddy ............... G06F 16/9537

OTHER PUBLICATIONS

U.S. Appl. No. 17/316,190, filed May 10, 2021, U.S. Pat. No. 11,615,123, Issued.
U.S. Appl. No. 16/502,729, filed Jul. 3, 2019, U.S. Pat. No. 11,036,772, Issued.
EPO The Hauge, Extended European Search Report for EP19830713.4 (8 pages), Mar. 1, 2022.
European Search Report and Search Opinion received for EP Application No. 19830713.4, mailed on Mar. 1, 2022, 8 pages.
International Searching Authority, International Search Report and Written Opinion for International Application No. PCT/US2019/040403, Oct. 1, 2019, (14 pages), USA.
Oracle: "Parallel Processing & Parallel Databases—Oracle8 Parallel Server Concepts & Administration Release 8.0", Dec. 1, 2016, XP093032869 Retrieved from the Internet:, https://web.archive.org/web/20161201193903/https://docs.oracle.com/cd/A58617_01/server.804/a58238/ch1_unde.htm, Mar. 20, 2023.

* cited by examiner

METHOD, SYSTEM, AND APPARATUS FOR RAPID GEOGRAPHIC SEARCH IN AN ACTOR-BASED GEOGRAPHIC SEARCH NETWORK

CROSS REFERENCE TO RELATED APPLICATIONS

This application is a continuation of U.S. application Ser. No. 17/316,190, filed May 10, 2021, which is a continuation of U.S. application Ser. No. 16/502,729, filed Jul. 3, 2019, and issued as U.S. Pat. No. 11,036,772 on Jun. 15, 2021, which claims priority to and the benefit of U.S. Provisional Patent Application No. 62/694,333, filed Jul. 5, 2018, the entire contents of each of which are incorporated herein by reference.

BACKGROUND

Conducting geographic search in response to a geographic query is a complex computational challenge involving numerous technological problems. Through applied effort, ingenuity, and innovation, many of these problems have been solved by developing solutions that are included in embodiments of the present disclosure, many examples of which are described in detail herein.

BRIEF SUMMARY

This specification relates to method, system, and apparatus for conducting rapid geographic search in an actor-based geographic search network comprising a quadrant manager, an aggregator, and a cell actor set. In one embodiment, an apparatus is configured to receive a geographic query by the aggregator from a computing entity, where the geographic query comprises point of interest (POI) coordinates data associated with a POI. The apparatus is configured to transmit the POI coordinates data to the quadrant manager from the aggregator. The apparatus is configured to determine a quadrant set covering the POI and is further configured to select a quadrant from the quadrant set by the quadrant manager. The apparatus is then configured to determine a quadrant instance set associated with the quadrant by the quadrant manager, where each quadrant instance of the quadrant instance set comprises a quadrant instance coordinates data set representing a collected or distributed geographic area.

In one embodiment, each quadrant instance of the quadrant instance set is associated with a respective cell actor set. The apparatus is configured to select an initial quadrant instance from the quadrant instance set by the quadrant manager, where the initial quadrant instance comprises an initial quadrant instance coordinates data set representing an initial collected or distributed geographic area.

The apparatus is further configured to forward the geographic query to an initial cell actor set associated with the initial quadrant instance by the aggregator in association with the quadrant manager, where each initial cell actor of the initial cell actor set is associated with a respective initial cell actor coordinates data set. The respective initial cell actor coordinates data set is a respective subset of the initial quadrant instance coordinates data set representing a respective geographic entity of the initial collected or distributed geographic area.

The apparatus is further configured to receive, from the initial cell actor set, an initial geographic response set in response to the geographic query by the aggregator. In one embodiment, each initial geographic response of the initial geographic response set is generated by the initial cell actor set in parallel based on determining whether the POI coordinates data is included in or relevant to the respective initial cell actor coordinates data set associated with a respective initial cell actor, wherein relevancy of the POI coordinates data and the respective initial cell actor coordinates data set is associated with a relevancy value. The apparatus is further configured to generate, by the aggregator, an aggregated geographic response based at least on the initial geographic response set received from the initial cell actor set. The apparatus is further configured to transmit the aggregated geographic response to the computing entity from the aggregator.

In other embodiments, such as a circumstance where the POI coordinates data is determined to be included in or relevant to the respective initial cell actor coordinates data set associated with the respective initial cell actor, the apparatus is additionally configured to generate, by the respective initial cell actor, an initial geographic response as a positive response. In a circumstance where the POI coordinates data is determined to be not included in or not relevant to the respective initial cell actor coordinates data set associated with the respective initial cell actor, the apparatus is additionally configured to generate, by the respective initial cell actor, the initial geographic response as a negative response.

In other embodiments, in a circumstance where the initial geographic response set received from the initial cell actor set includes all negative responses, the apparatus is additionally configured to generate the aggregated geographic response as a mismatch response by the aggregator. In a circumstance where the initial geographic response set received from the initial cell actor set does not include all negative responses, the apparatus is additionally configured to generate the aggregated geographic response as a match response by the aggregator.

In other embodiments, in a circumstance where the initial geographic response set received from the initial cell actor set includes all negative responses, the apparatus is additionally configured to forward the geographic query to a subsequent cell actor set associated with a subsequent quadrant instance by the aggregator. In embodiments, the subsequent quadrant instance comprises a subsequent quadrant instance coordinates data set representing a subsequent collected or distributed geographic area adjacent to or broader than the initial collected or distributed geographic area represented by the initial quadrant instance coordinates data set. In embodiments, each subsequent cell actor of the subsequent cell actor set is associated with a respective subsequent cell actor coordinates data set, where the respective subsequent cell actor coordinates data set is a respective subset of the subsequent quadrant instance coordinates data set representing a respective geographic entity of the subsequent collected or distributed geographic area. The apparatus is further configured to receive, by the aggregator from the subsequent cell actor set, a subsequent geographic response set in response to the geographic query. In embodiments, each subsequent geographic response of the subsequent geographic response set is generated by the subsequent cell actor set in parallel based on determining whether the POI coordinates data is included in or relevant to the respective subsequent cell actor coordinates data set associated with a respective subsequent cell actor, wherein the relevancy of the POI coordinates data and the subsequent cell actor coordinates data set is associated with the relevancy value. The apparatus is further configured to generate, by the aggregator, the aggregated geographic response based on the initial geographic response set received from the initial cell actor set and the subsequent geographic response set received from the subsequent cell actor set.

In other embodiments, in a circumstance where the POI coordinates data is determined to be included in or relevant to the respective subsequent cell actor coordinates data set associated with the respective subsequent cell actor, the apparatus is further configured to generate, by the respective subsequent cell actor, a subsequent geographic response as a positive response. In a circumstance where the POI coordinates data is determined to be not included in or not relevant to the respective subsequent cell actor coordinates data set associated with the respective subsequent cell actor, the apparatus is further configured to generate, by the respective subsequent cell actor, the subsequent geographic response as a negative response.

In other embodiments, in a circumstance where the initial geographic response set received from the initial cell actor set and the subsequent geographic response set received from the subsequent cell actor set include all negative responses, the apparatus is further configured to generate the aggregated geographic response as a mismatch response by the aggregator. In a circumstance where the initial geographic response set received from the initial cell actor set and the subsequent geographic response set received from the subsequent cell actor set do not include all negative responses, the apparatus is further configured to generate the aggregated geographic response as a match response by the aggregator.

In other embodiments, the apparatus is additionally configured to select the quadrant from the quadrant set based on a predetermined rules set. In embodiments, the predetermined rules set is associated with a query density value.

In other embodiments, the apparatus is additionally configured to determine the quadrant instance set associated with the quadrant based on a predetermined rules set. In embodiments, the predetermined rules set is associated with a total redemption value associated with each quadrant instance of the quadrant instance set.

In other embodiments, the apparatus is additionally configured to select the initial quadrant instance from the quadrant instance set based on a predetermined rules set. In embodiments, the predetermined rules set is associated with selecting a highest total redemption value.

In other embodiments, the POI coordinates data can optionally comprise a latitude-longitude pair associated with the POI.

In other embodiments, the initial aggregator is optionally associated with an aggregator identifier.

In other embodiments, the geographic query can optionally comprise the aggregator identifier.

In other embodiments, each subsequent geographic response of the subsequent geographic response set received from the subsequent cell actor set can optionally comprise the aggregator identifier.

In other embodiments, the POI coordinates data can be Cartesian coordinates data or GPS coordinates data.

In other embodiments, the POI can be a redeemable geographic location where a provider offers a redeemable promotion accessible to a user associated with the computing entity. In such embodiments, the aggregated geographic response is associated with a provider search result in response to the geographic query for searching the provider offering the redeemable promotion.

In other embodiments, the collected or distributed geographic area is a geographic location, a plurality of geographic locations, a neighborhood, a local region, a division, a zipcode area, a city, a county, a state, or a country.

Other embodiments include corresponding systems, methods, and computer programs, configured to perform the operations of the apparatus, encoded on computer storage devices.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
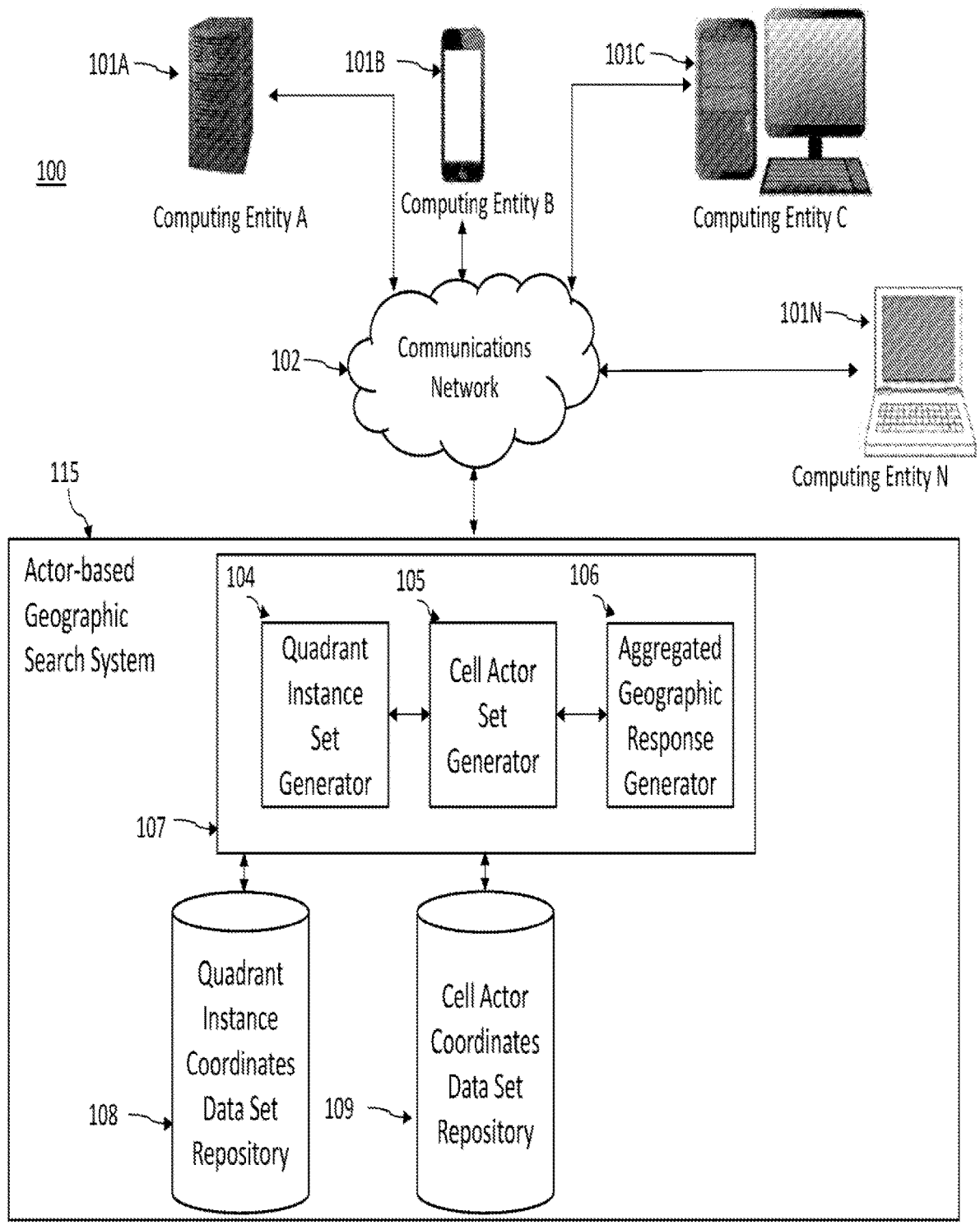
Figure 2:
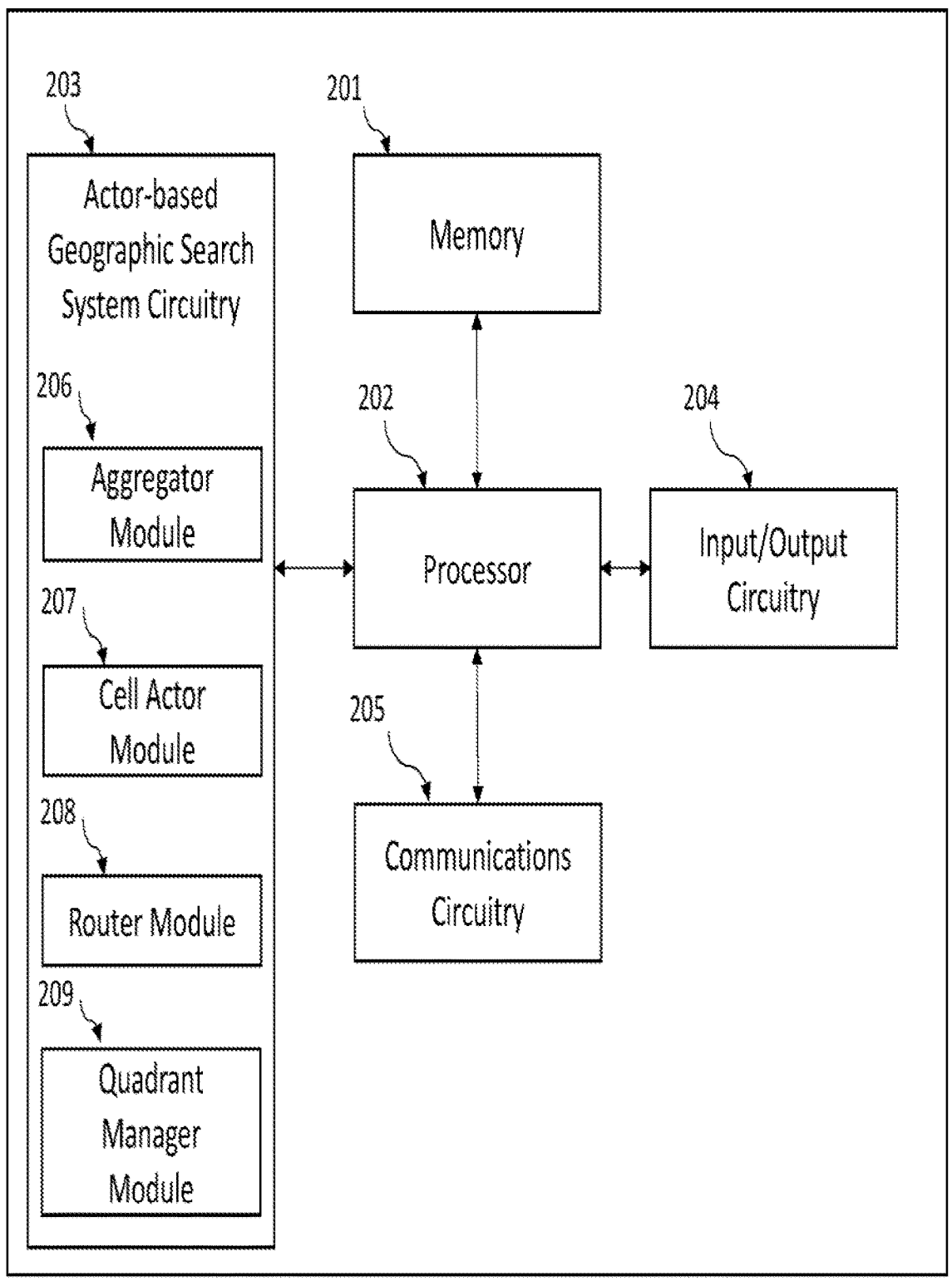
Figure 3A:
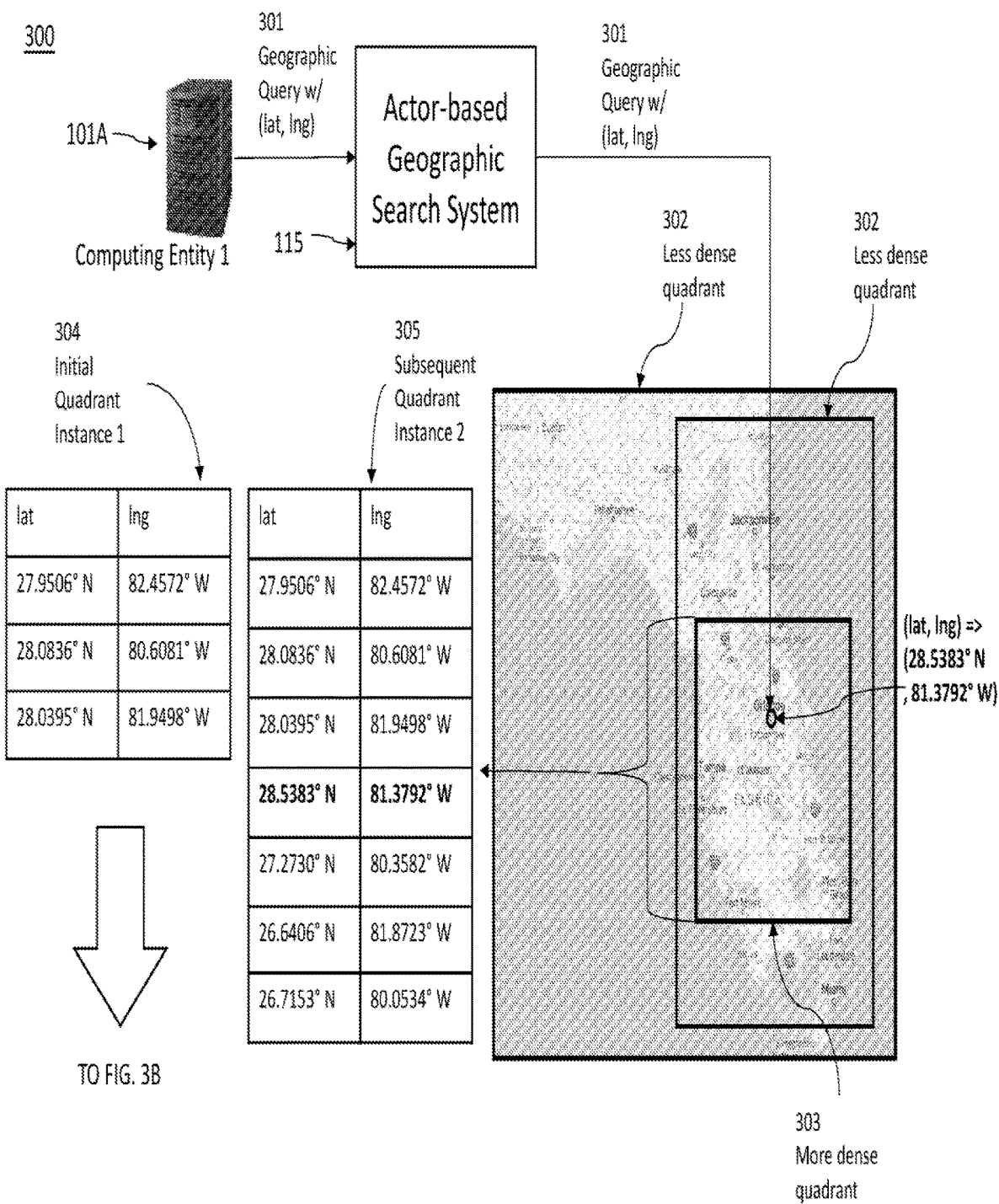
Figure 3B:
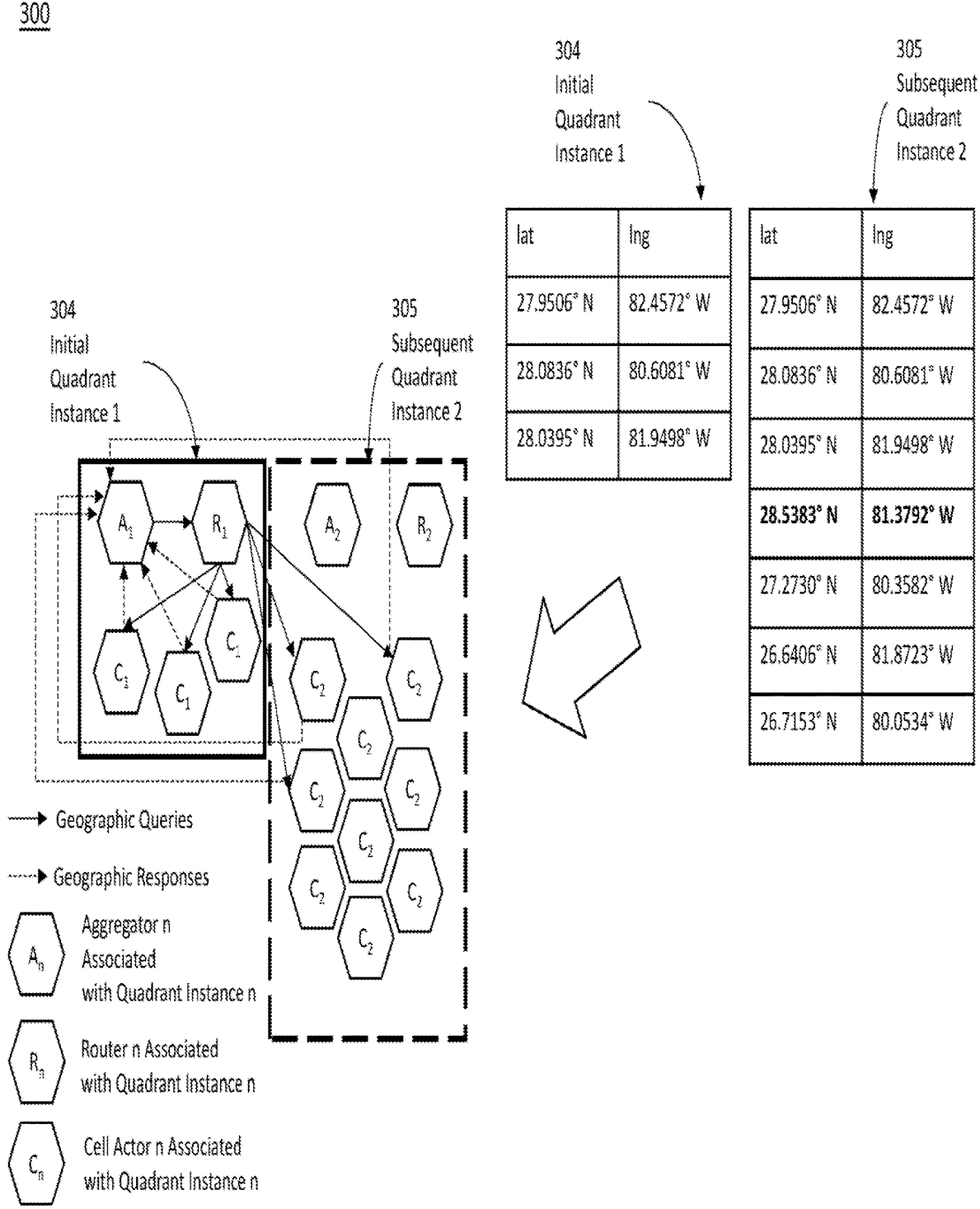
Figure 4:
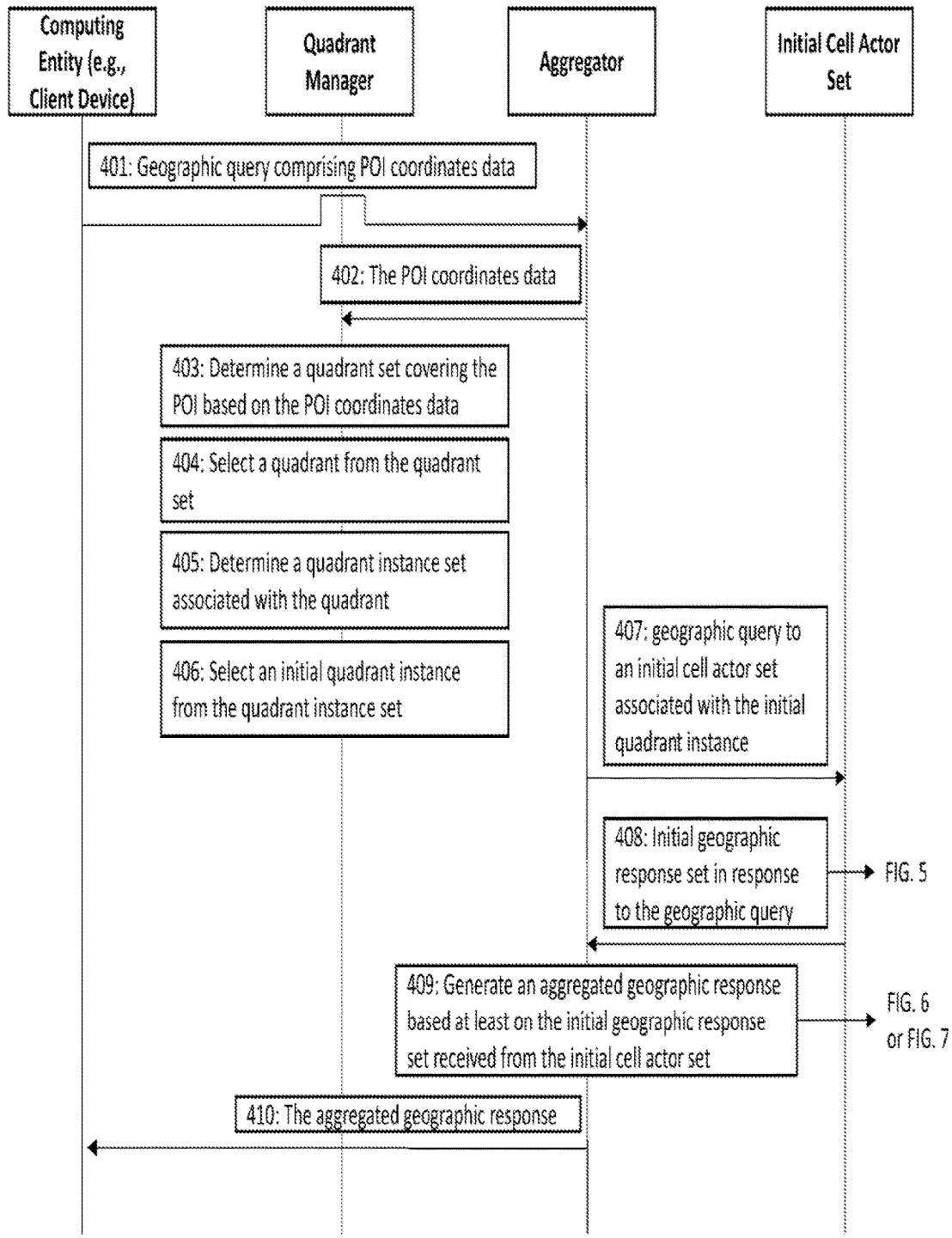
Figure 5:
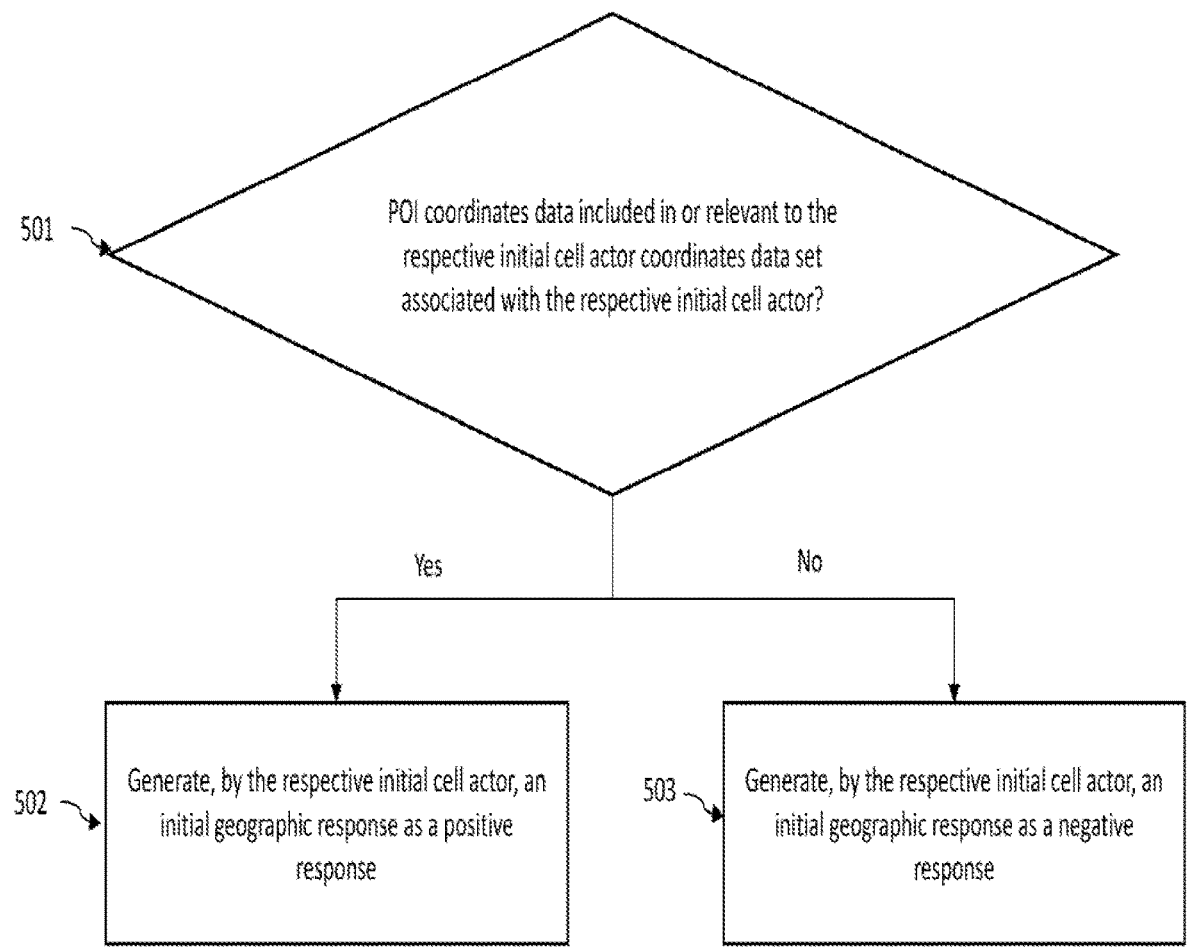
Figure 6:
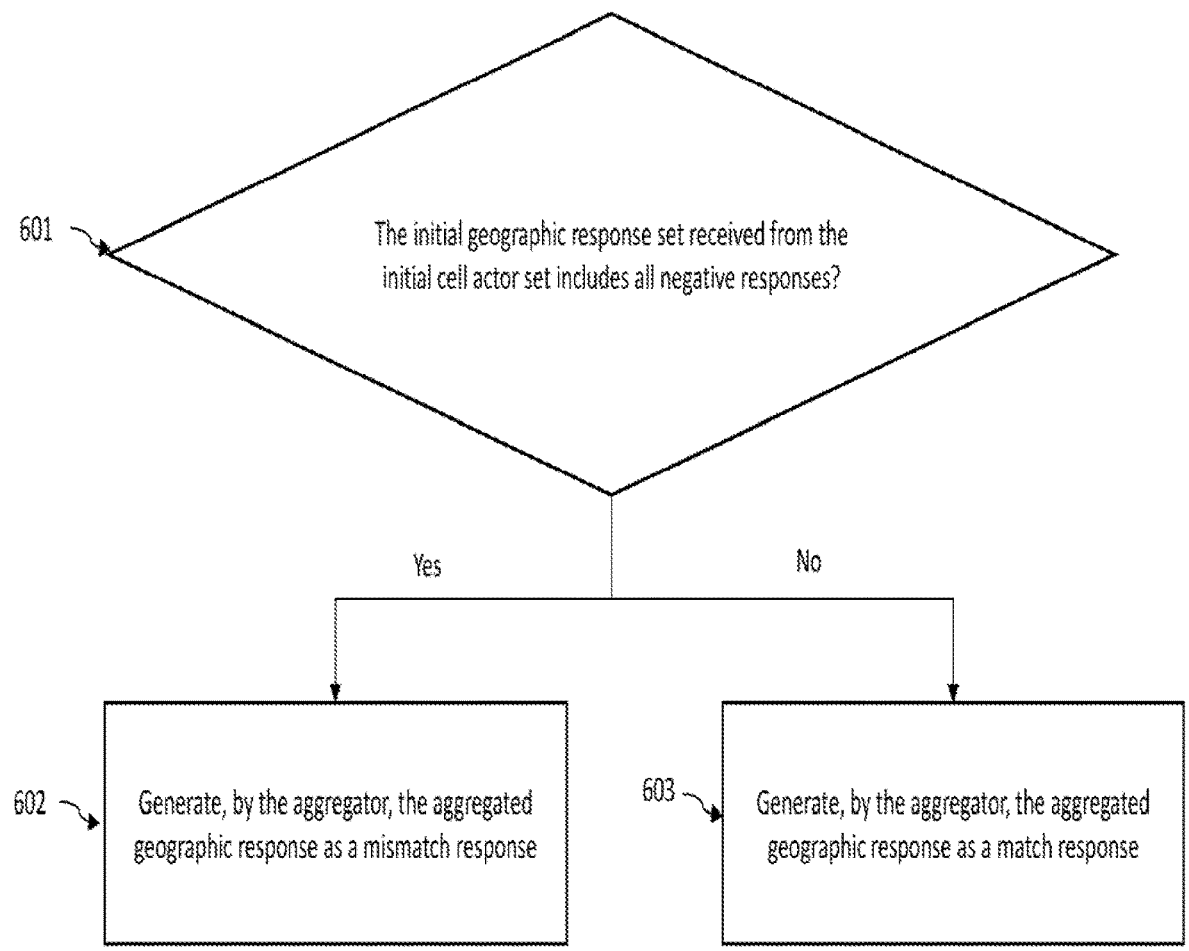
Figure 7:
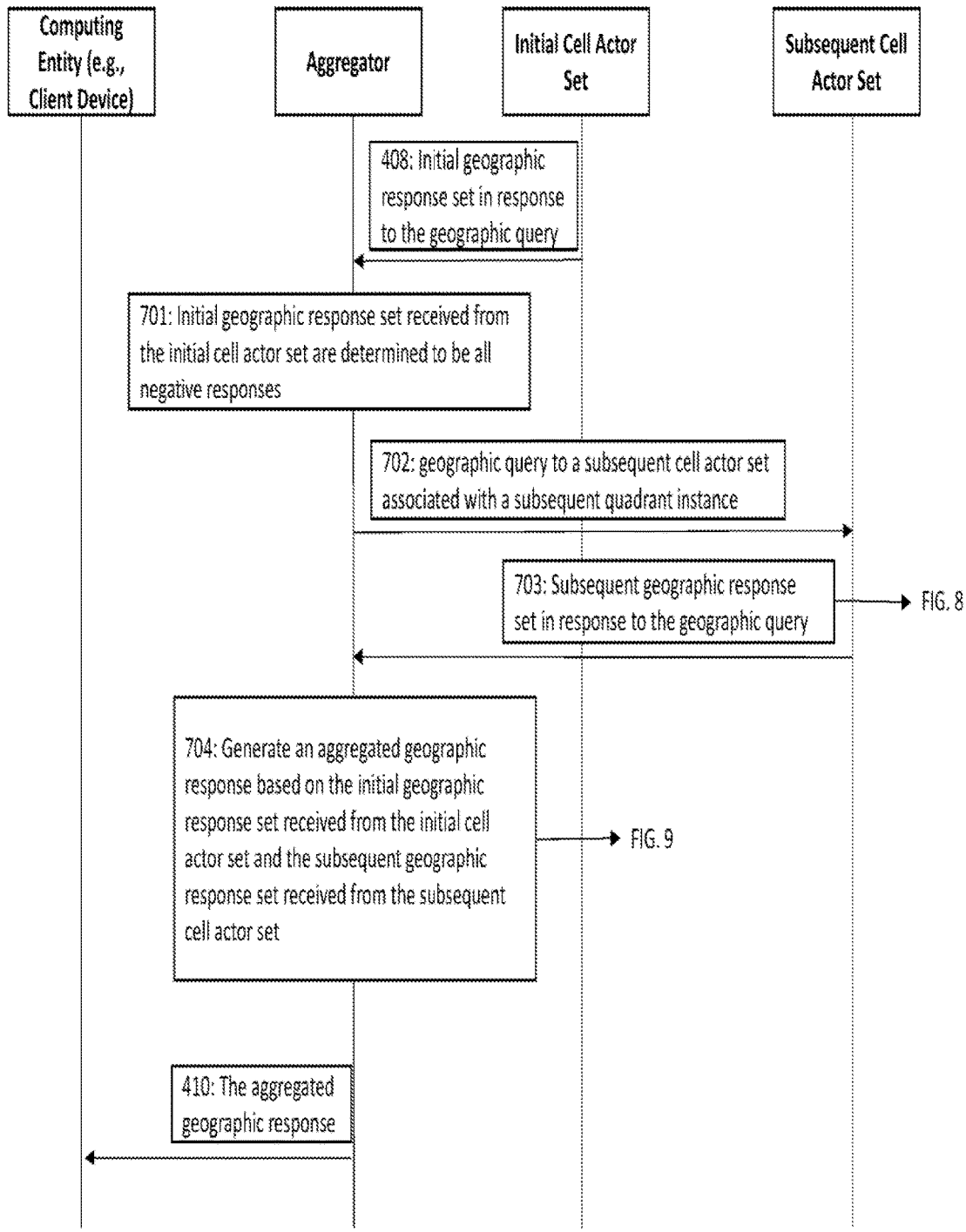
Figure 8:
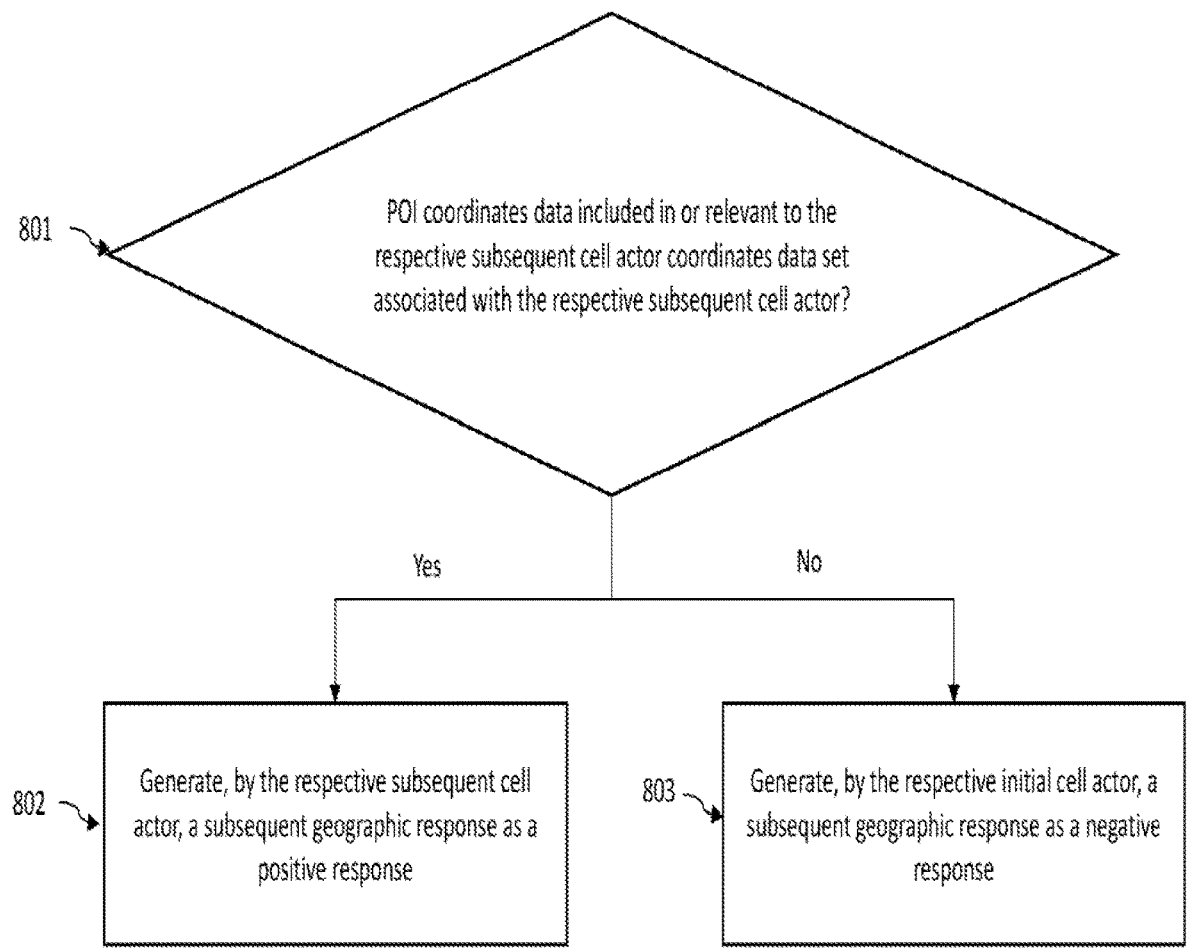
Figure 9:
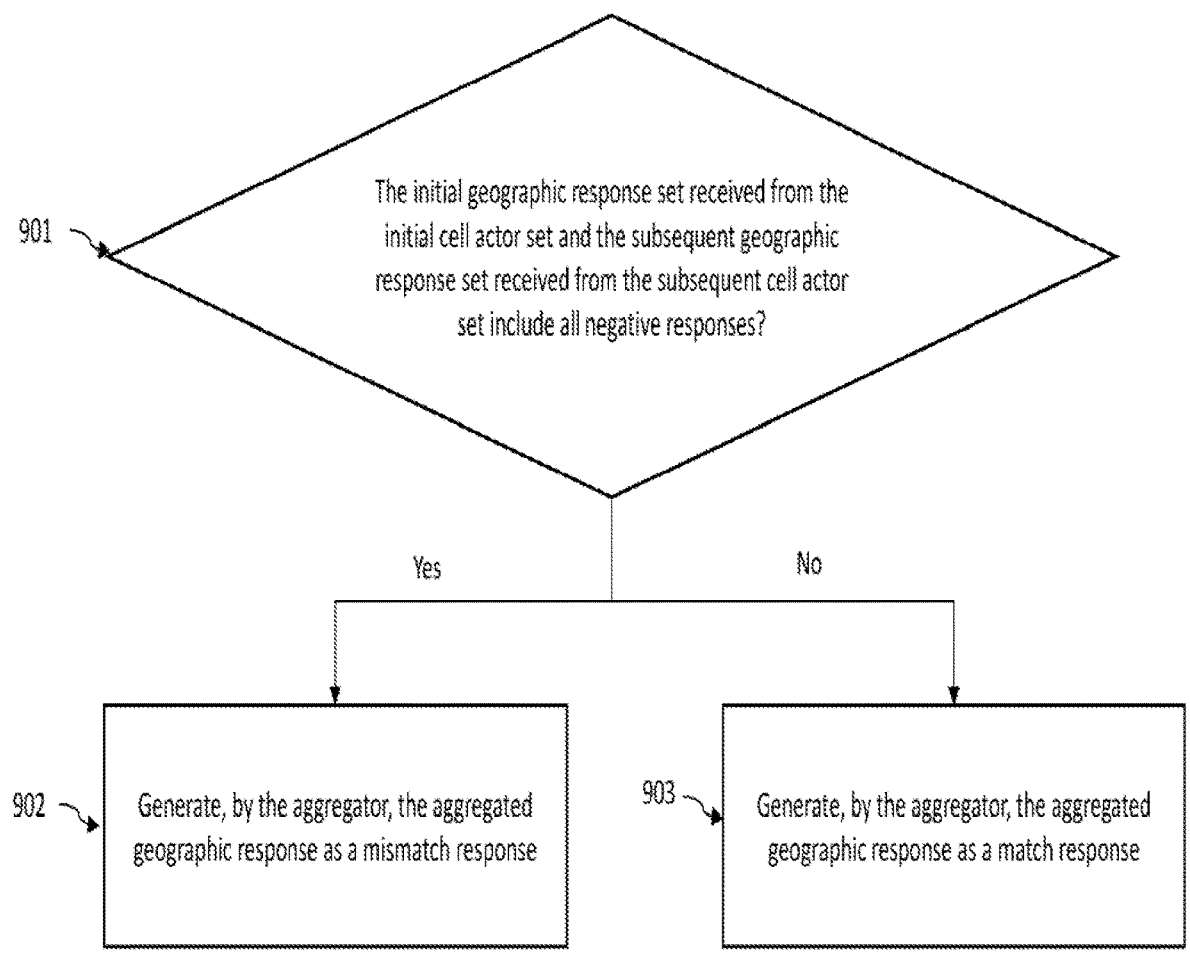

Having thus described the disclosure in general terms, reference will now be made to the accompanying drawings, which are not necessarily drawn to scale, and wherein:

FIG. 1 illustrates an exemplary logical design diagram of an actor-based geographic search network configured to practice embodiments of the present disclosure;

FIG. 2 illustrates an exemplary schematic diagram of a computing unit or server configured as part of an actor-based geographic search system according to one embodiment of the present disclosure;

FIG. 3A illustrates an exemplary embodiment for conducting rapid geographic search in an actor-based geographic search network according to one embodiment of the present disclosure;

FIG. 3B illustrates an exemplary embodiment of the association of quadrant instance coordinate data sets and respective cell actor sets according to one embodiment of the present disclosure;

FIG. 4 illustrates a signal diagram for conducting rapid geographic search in an actor-based geographic search network according to one embodiment of the present disclosure;

FIG. 5 illustrates an exemplary process for generating each initial geographic response of an initial geographic response set according to one embodiment of the present disclosure;

FIG. 6 illustrates an exemplary process for generating an aggregated geographic response based on the initial geographic response set according to one embodiment of the present disclosure;

FIG. 7 illustrates a signal diagram for generating an aggregated geographic response based at least on the initial geographic response set according to one embodiment of the present disclosure;

FIG. 8 illustrates an exemplary process for generating each subsequent geographic response of a subsequent geographic response set according to one embodiment of the present disclosure; and FIG. 9 illustrates an exemplary process for generating an aggregated geographic response based on the initial geographic response set and the subsequent geographic response set according to one embodiment of the present disclosure.

DETAILED DESCRIPTION OF VARIOUS EMBODIMENTS

Various embodiments of the present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure relate to conducting geographic search in an actor-based geographic search network. Given the complex and highly dynamic nature of many actor-based networks, geographic searches may be slow and/or computationally resource intensive.

Embodiments of the present disclosure resolve such issues and facilitate the conduct of rapid geographic search in response to a geographic query received from a computing entity. According to the embodiments of the disclosure, rapid geographic search may be conducted using an actor-based geographic search network that comprises a plurality of computing entities, a communications network, and an actor-based geographic search system comprising a plurality of actors (e.g., cell actors, aggregators, or routers). The actor-based geographic search system, upon receiving a geographic query from a computing entity via the communications network, may divide the geographic search task into smaller tasks and delegate the smaller tasks to the actors. By the geographic search task division, the actor-based geographic search system creates an abstract layer for multi-task computing using a cluster of actors that may conduct geographic search in parallel. Due to the creation of the abstract layer, the actor-based geographic search system can process the geographic query efficiently by reducing processing time and resources caused by conducting a single geographic search task within a vast geographic database by a single computing entity.

In embodiments, the actors may serve as independent computing entities and carry out the smaller geographic search tasks in parallel. The actor-based geographic search system may then collect the geographic search responses from the actors and aggregate them into an aggregated geographic response. In embodiments, the actor-based geographic search system may further transmit, via the communications network, the aggregated geographic response to the computing entity that originated the geographic query.

Geographic search in response to a geographic query is conducted by searching point of interest (POI) coordinates data (e.g., Cartesian coordinates data or GPS (Global Positioning System) coordinates data) stored within a geographic database. However, such database searches may be plagued by long response times or other latency issues. For example, conducting a geographic database search by matching a received geographic query with POI coordinates data stored within a geographic database may require a response time that is correlated to the size of the geographic database. The required response time would be especially long when the searched geographic database covers a large region of the globe or grows to encompass vast amounts of POI coordinates data over time.

The inventors have determined that an actor-based geographic search system configured in accordance with various embodiments of the present invention can conduct rapid geographic search using an actor-based geographic search network to reduce response times even when searching vast geographic databases. In one embodiment, an actor-based geographic search system may forward a geographic query received from a computing entity to a plurality of cell actors, where each cell actor is only responsible for conducting geographic search in its corresponding geographic database, which covers only a smaller geographic entity of a wider geographic area. Each cell actor may generate a geographic response in parallel after searching their respective database. The actor-based geographic search system receives and then aggregates all geographic responses into an aggregated geographic response. The actor-based geographic search system then transmits, via the communications network, the aggregated geographic response back to the computing entity that originated the geographic query. Since all of the geographic responses used to generate the aggregated geographic response are computed in parallel and the sizes of the corresponding databases searched are small, at least relative to the overall volume of data searched, the response time associated with the geographic search triggered by the geographic query may be significantly reduced.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing entity is described herein to receive data from another computing entity, it will be appreciated that the data may be received directly from another computing entity or may be received indirectly via one or more intermediary computing entities, such as, for example, one or more servers, relays, routers, network access points, base stations, hosts, and/or the like, sometimes referred to herein as a "network." Similarly, where a computing entity is described herein to send data to another computing entity, it will be appreciated that the data may be sent directly to another computing entity or may be sent indirectly via one or more intermediary computing entities, such as, for example, one or more servers, relays, routers, network access points, base stations, hosts, and/or the like.

The term "computing entity" refers to computer hardware and/or software that is configured to access a service made available by a server. The server is often (but not always) on another computer system, in which case the computing entity accesses the service by way of a network. For example, computing entities may be client devices that include, without limitation, smart phones, tablet computers, laptop computers, wearables, personal computers, enterprise computers, and the like, referred to herein as a "client device." For another example, computing entities may be other intermediary computing entities, such as, for example, servers, relays, routers, network access points, base stations, hosts, and/or the like, sometimes referred to herein as a "networked device," that provide services to client devices for assessing the geographic search service made available by the server in the actor-based geographic search system.

As used herein, the terms "user," "client," "consumer," and "customer" may be used interchangeably to refer, without limitation, to a client, customer, user and the like who may be using a client device to receive and interact with a device rendered object.

The term "device rendered object" may be used to refer to a set of data and executable instructions that, when received and executed by a processor of a computing entity, render an object or interface for display that is engageable by the user of the computing entity. An example of a device rendered object can be data and instructions that, when executed by a processor, render a promotion. The promotion may include any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An instrument may be any type of gift card, tender, electronic certificate, medium of exchange, voucher, or the like that embodies terms of the promotion from which the instrument resulted and may be used toward at least a portion of the purchase, acquisition, procurement, consumption or the like of goods, services and/or experiences.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data (e.g., metadata, referential or correleatable data stored to a database) indicating one or more categories (such as a restaurant promotion, a spa promotion, a travel promotion, a local promotion, etc.), sub-categories (such as a sushi restaurant), location, hyper-locations, prices or the like. For example, a promotion rendered in response to a device rendered object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing entities and that is operable to generate device rendered objects for transmission to vast numbers of client devices on behalf of one or more providers that are offering one or more promotions that, when purchased, are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object. For example, if the category data associated with a device rendered object is "beauty, wellness and healthcare," the value of the one attribute is 1. If the category data associated with a device rendered object is not "beauty, wellness and healthcare," the value of the one attribute is 0.

It should also be understood that a location, hyper-location, category or sub-category may affect data available for the provider of a promotional transaction. For example, promotion transactions purchased from providers from different locations (e.g., different countries, states, neighborhoods or the like) may be associated with different attribute data. For example, different countries have different credit reporting rules and agencies. Thus, a device rendered object service may utilize a first combination of attributes for metadata associated with a device rendered object associated with a promotion from a provider in a first location, hyper-location, category or sub-category and a second combination of attributes for metadata associated with a device rendered object associated with a promotion from provider in a second location, hyper-location, category or sub-category.

Similar attributes may be clustered, grouped, or aggregated. For example, attributes associated with locations or location based attributes may be grouped under header attribute "location." For example, a division attribute specifying a local region (e.g., city block, hyper-location) where a promotion is offered and an attribute specifying a distance from a pre-defined landmark (e.g., center of a city, lat/lng coordinates, etc.) may be clustered under the location header attribute. Similarly, attributes associated with "past performance," "category & service," "completion," "maximum capacity," "hero score," "review data" may each also be clustered and/or grouped under header attributes. For example, with respect to device rendered objects associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and excludes the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

The term "device rendered object interaction" refers to client device outputs or electronic actions taken by a client device in response to receipt and rendering of a device rendered object. In some examples, the device rendered object interaction may take the form of non-transitory signals generated by the client device representing user engagement of an interface generated by the client device upon receiving the device rendered object. Such non-transitory signals could represent viewing of a promotion interface, scrolling through a promotion interface, selection of a widget or menu associated with the promotion interface, purchase of a promotion embodied by the promotion interface, and/or the like.

In some embodiments, the interaction data may include various other interactions, including without limitation, mouse-over events and durations, the amount of time spent by the client device viewing particular content, the rate at which impressions of particular interface content result in purchases or other user engagement associated with that content, demographic information associated with each particular user using the client device, data indicating other content accessed by the client device (e.g., browser cookie data), the time or date on which content was accessed, the frequency of impressions for particular content, associations between particular clients or client demographics and particular impressions, and/or the like.

The term "programmatically expected" indicates machine prediction of occurrence of certain events.

As used herein, the term "likelihood" refers to a measure of probability for the occurrence of a particular event. For example, the likelihood that a client device will interact with a promotion interface generated following receipt of a device rendered object may be a value associated with a specific scale. In some implementations, the machine predictions discussed above and below are based, at least in part, on the "likelihood" that an event will occur.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

It should be appreciated that the term "subset" describes a proper subset. A proper subset of the set is a portion of the set that is not equal to the set. For example, if elements A, B, and C belong to a first set, a subset including elements A and B is a proper subset of the first set. However, a subset including elements A, B, and C is not a proper subset of the first set.

It should be appreciated that the term "in parallel" refers to circumstances where two or more events occur within a time period that is less than, often considerably less than, a time period that would be required if such events occurred sequentially or in series. The term "in parallel" is not used in an absolute sense and does not require that events or tasks occur in an identical or precisely synchronized time period. For example, if two messages generated in parallel by two computing entities, then such messages are generated in a time period that is less than that which would be required if such messages were generated sequentially. In order words, the time period needed to generate the first message is at least partly coextensive with (and often substantially overlaps) the time period needed to generate the second message.

As used herein, the term "actor-based geographic search network" refers to a communication network that may comprise a plurality of computing entities, communications networks, and an actor-based geographic search system comprising a plurality of actors for conducting geographic search computing in parallel. An actor in an actor-based geographic search network may be a computational unit that, in response to a message it receives, may carry out multiple computations in parallel, including sending messages to other actors, delegating work by creating a finite number of new actors in a supervisor-worker relationship, or designating a function which defines the actions to be taken in reaction to the message at that point in time. A plurality of actors in an actor-based geographic search network may communicate with each other by exchanging messages. The actor-based geographic search network may form a hierarchical structure to split up and delegate multiple programming instructions/tasks for reducing the computational complexity of those programming instructions/tasks.

In one embodiment of the present disclosure, an actor-based geographic search network comprises an actor-based geographic search system that comprises a plurality of actors for conducting geographic search in response to a geographic query received from a computing entity. The actors in the actor-based geographic search system may form a hierarchical structure, including aggregators, routers, and cell actor sets. In such an embodiment, upon receiving a geographic query from a computing entity, an aggregator may forward, via different routers, the geographic query to a plurality of cell actor sets for delegating multiple geographic search tasks to each cell actor within each cell actor set. The aggregator may collect, from each cell actor directly or via an auxiliary actor called collector, the geographic responses generated in response to the geographic search tasks delegated to each cell actor and generate an aggregated geographic response. Any aggregator may further transmit, via the communications network, the aggregated geographic response to the computing entity originated the geographic query.

As used herein, the term "geographic query" refers to one or more items of data representing a request issued by a computing entity for conducting a geographic search computation. In one embodiment, a geographic query may comprise POI coordinates data (defined below), such as Cartesian coordinates data or GPS coordinates data, associated with a geographic location of a point of interest (POI, defined below). In such an embodiment, the geographic query may be sent by the computing entity to a cluster of an actor-based geographic search system for requesting the cluster to conduct a rapid geographic search computation. In such an embodiment, the cluster may generate a geographic response based on the geographic query received from the computing entity and a geographic database stored in a memory of the cluster.

As used herein, the term "point of interest (POI)" refers to a geographic point that may be identified by coordinates (e.g., latitude and longitude coordinates) in a grid geographic coordinate system. In one embodiment, a POI may be identified by Cartesian coordinates that may be programmatically generated and represented by a set of numbers or a combination of the numbers. The coordinates are often chosen such that one of the numbers represents a vertical position, and other numbers represent a horizontal position. For example, coordinates may be a set of three numbers (x, y, z), where x represents latitude, y represents longitude, and z represents elevation. In another embodiment, a POI may be identified by GPS coordinates that may be programmatically generated and represented by a latitude-longitude pair (defined below) or a combination of latitude and longitude. In such an embodiment, a latitude value may be in decimal degrees format and range from −90 to 90 and a longitude value may be in decimal degrees format and range from −180 to 180.

As used herein, the terms "coordinates data," "coordinates data set," "geographic data," "spatial data," and "geospatial data" refer to one or more items of geographic data that may represent geographic location(s) by numerical values in a geographic coordinate system. In one embodiment, coordinates data may be GPS coordinates data defined in a GPS grid geographic coordinate system. In such an embodiment, the GPS coordinates data may be created by GPS receivers of computing entities by processing signals broadcasted by GPS satellites. In such an embodiment, the GPS coordinates data may be represented by a latitude-longitude pair (defined below) or a combination of latitude and longitude that uses two coordinates to represent a geographic location on the plane of a geographic coordinate system. In another embodiment, coordinates data may be non-GPS coordinates data defined in another grid geographic coordinate system, such as Cartesian coordinates data defined in a Cartesian grid geographic coordinate system. In such an embodiment, the coordinates data may also be represented by a latitude-longitude pair (defined below) or a combination of latitude and longitude that uses two coordinates to represent a geographic location on the plane of a geographic coordinate system.

The term "POI coordinates data" refers to coordinates data associated with a POI. The POI coordinates data may provide information to identify an approximate geographic location of the POI on the Earth at a given time.

As used herein, the term "geographic area" refers to an area covering a physical region of the globe. In one embodiment, a geographic area may be a surface area of the Earth and any of the surface areas of the Earth may be divided according to latitude or longitude. As used herein, the term "collected geographic area" refers to an aggregated collection of geographic points, where the geographic points are close or near to each other in a narrower geographic area. As used herein, the term "distributed geographic area" refers to a scattered collection of geographic points, where the geographic points are distributed or spread over a wider geographic area.

As used herein, the term "geographic entity" refers to a sub-part of a collected or distributed geographic area (i.e., a portion of the physical region covered by the collected or distributed geographic area). In one embodiment, a geographic area may be a surface area or a collection of scattered geographic points on Earth that is divided by a plurality of geographic entities, where each geographic entity covers a portion of the geographic area. For example, a geographic entity may be a city, a region sharing the same zip code, a neighborhood, or a point of interest.

As used herein, the term "quadrant" refers to region of interest defined by an actor-based geographic search system that is associated with a POI. In one embodiment, a quadrant may define a programmatically generated boundary around a geographic area, geographic entity, group of geographic entities, or portion thereof which includes a POI associated with a geographic query sent from a computing entity. The term "quadrant set" refers to a plurality of quadrants.

As used herein, the term "quadrant instance" refers to coordinates data (such as GPS coordinates data represented by a latitude value and a longitude value) pre-defined by an actor-based geographic search system that is associated with a quadrant as defined above, where the quadrant instance represents smaller subset of interest within the quadrant and is pre-defined by the actor-based geographic search system based on a predetermined rules set. In one embodiment, a quadrant may be associated with multiple quadrant instances, where each quadrant instance comprises a respective coordinates data set representing a respective subset of geographic area (distributed or collected) within the quadrant. The term "quadrant instance set" refers to a plurality of quadrant instances. For example, a quadrant instance set associated with a quadrant may be pre-defined by the actor-based geographic search system based on a total redemption value (defined below) associated with each quadrant instance of the quadrant instance set.

As used herein, the term "total redemption value" refers to a value that is programmatically generated based on the total amount of redemptions associated with a quadrant instance within the respective geographic area. The total redemption value may reflect the population density of the respective geographic area. In one embodiment, a total redemption value associated with a quadrant instance is programmatically generated by accumulating a total amount of redemptions completed by users using client devices within the respective geographic area associated with the quadrant instance. The term "highest total redemption value" refers to the largest total redemption value among total redemption values associated with a quadrant instance set that is associated with a quadrant.

The term "quadrant instance coordinates data set" refers to a coordinates data set associated with a selected quadrant instance after receiving a geographic query from a computing entity, where the quadrant instance coordinates data set covers a respective subset of geographic area (distributed or collected) within an associated quadrant. In embodiments, the quadrant instance coordinates data set associated with a quadrant may be pre-defined by the actor-based geographic system based on a predetermined rules set associated with concepts of business density values, total redemption values, population density values, or proximity values.

The term "cell actor coordinates data set" refers to a coordinates data set associated with a cell actor associated with a selected quadrant instance. The cell actor coordinates data set covers a geographic entity (defined above) representing a smaller region of the geographic area (collected or distributed) that the quadrant instance coordinates data set represents.

As used here, the term "quadrant manager" refers to a computational unit configured in an actor-based geographic search system that is in charge of managing quadrants and quadrant instances associated with predetermined business rules and geographic queries received. In embodiments, the quadrant manager may determine a relevant quadrant set based on the geographic query received, select a quadrant among the quadrant set based on predetermined business rules, determine a quadrant instance set associated with the quadrant, or select an initial quadrant instance from the quadrant instance set for initiating the geographic search.

As used herein, the term "aggregator" refers to a computational unit configured in an actor-based geographic search system that is associated with a quadrant instance comprising a quadrant instance coordinates data set. An aggregator is configured to transmit a geographic query to multiple computational units in parallel. In one embodiment, an aggregator may be configured to transmit, via a router (defined below), a geographic query received from a computing entity to multiple cell actors (defined below) in parallel.

The term "initial aggregator" refers to a subset of aggregators configured to receive geographic query from a computing entity and forward the geographic query to its respective cell actors. The initial aggregator is associated with the initial quadrant instance that is selected based on a predetermined rules set. In one embodiment, the predetermined rules set is associated with a total redemption value. In such an embodiment, the initial aggregator is associated with the initial quadrant instance with the highest total redemption value. The term "subsequent aggregator" refers to a subset of aggregators configured to receive geographic query from an initial aggregator and forward the geographic query to its respective cell actors. The subsequent aggregator is associated with the subsequent quadrant instance that is selected based on a predetermined rules set. In one embodiment, the predetermined rules set is associated with proximity or a scale difference between a subsequent quadrant instance and the initial quadrant instance with the highest total redemption value. In such an embodiment, the subsequent aggregator is associated with the subsequent quadrant instance that is adjacent to or broader than (and thus includes) the initial quadrant instance. In another embodiment, the predetermined rules set is associated with metadata for searching a POI. In such an embodiment, the subsequent aggregators are associated with all geographic entities that are associated with the POI.

As used herein, the term "cell actor set" refers to a plurality of computing units configured in an actor-based geographic search system that are associated with a quadrant instance comprising a quadrant instance coordinates data set covering a respective collected or distributed geographic area within an associated quadrant, where each cell actor is associated with a respective cell actor coordinates data set covering a respective geographic entity within the respective collected or distributed geographic area. The plurality of cell actors may receive a geographic query from an initial aggregator (defined above) that is associated with the same quadrant instance and carry out a geographic search computation based on the respective cell actor coordinates data set. In one embodiment, each cell actor that is associated with a respective cell actor coordinates data set may receive a geographic query from an aggregator that is associated with a quadrant instance comprising the quadrant instance coordinates data set. In such an embodiment, each cell actor may generate a respective response based on the geographic query and the respective cell actor coordinates data set for determining whether the geographic query is covered by or relevant to a geographic entity represented by the respective cell actor coordinates data set, where the relevancy is associated with a relevancy score (defined below).

As used herein, the term "router" refers to a computational unit configured in an actor-based geographic search system that may forward data or data packets between multiple computational units in an actor-based geographic search system. In one embodiment, a router is associated with a quadrant instance comprising a quadrant instance coordinates data set covering a geographic area within an associated quadrant. In such an embodiment, the router may receive a geographic query from an aggregator that is associated with the same quadrant instance and forward the geographic query to multiple cell actors that are associated with the same quadrant instance or other adjacent quadrant instances.

As used herein, the term "aggregator identifier" refers to one or more items of data by which an aggregator may be identified.

In one embodiment, a quadrant instance may be associated with an aggregator, a router, and a plurality of cell actors, where the aggregator is associated with an aggregator identifier. In such an embodiment, an aggregator may forward the geographic query and the aggregator identifier to the plurality of cell actors via the router. In such an embodiment, each cell actor may send back a respective response to the aggregator with reference to the aggregator identifier.

As used herein, the term "geographic response" refers to one or more items of data including an electronic message programmatically generated in response to a geographic query for conducting a geographic search computation. In one embodiment, a computing entity may send, to an actor-based geographic search system comprising aggregators and cell actors, a geographic query comprising POI coordinates data associated with a POI. In such an embodiment, a geographic query received from the computing entity may be sent by the aggregator and received by multiple cell actors that are associated with a quadrant instance comprising a quadrant instance coordinates data set covering a respective geographic area within an associated quadrant, where each cell actor is associated with a respective cell actor coordinates data set covering a geographic entity within the respective geographic area. In such an embodiment, each cell actor may generate a respective geographic response based on whether the coordinates data is included in or is relevant to the respective cell actor coordinates data set, where the relevancy is associated with a relevancy score (defined below). The term "geographic response set" refers to a plurality of geographic responses received from a plurality of cell actors associated with the same quadrant instance.

As used herein, the term "positive response" refers to one or more items of data including an electronic message programmatically generated in response to a geographic query after conducting a geographic search computation and receiving a positive search result. In the above embodiment, a cell actor may generate a positive response if the coordinates data comprised in the geographic query is included in or relevant to the subset of the coordinates data set associated with the cell actor or is determined to be not relevant to the subset of the coordinates data set associated with the cell actor. The relevancy is associated with a relevancy value (defined below) that is determined based on a predetermined rules set associated with distance, tolerance, relevance, etc.

As used herein, the term "negative response" refers to one or more items of data including an electronic message programmatically generated in response to a geographic query after conducting a geographic search computation and receiving a negative search result. In the above embodiment, a cell actor may generate a negative response if the coordinates data comprised in the geographic query is not included in or not relevant to the subset of the coordinates data set associated with the cell actor.

As used herein, the term "aggregated geographic response" refers to one or more items of data including an electronic message programmatically generated in response to a geographic query after aggregating multiple geographic responses received from multiple computational units configured in an actor-based geographic search system. In the above embodiment, an aggregator configured in an actor-based geographic search system may generate an aggregated geographic response after aggregating multiple geographic responses from multiple cell actors configured in an actor-based geographic search system. In such an embodiment, the aggregator may further transmit the generated aggregated geographic response to the computing entity in response to the geographic query.

As used herein, the term "match response" refers to one or more items of data including an electronic message programmatically generated in response to a geographic query after aggregating multiple geographic responses received from multiple computational units configured in an actor-based geographic search and receiving at least one positive response among the multiple geographic responses. In the above embodiment, an aggregator may generate a positive response as an aggregated geographic response if at least one of the geographic responses received from multiple cell actors is a positive response.

As used herein, the term "mismatch response" refers to one or more items of data including an electronic message programmatically generated in response to a geographic query after aggregating multiple geographic responses received from multiple computational units configured in an actor-based geographic search system and receiving all negative responses. In the above embodiment, an aggregator may generate a negative response as an aggregated geographic response if all of the geographic responses received from multiple cell actors are all negative responses.

As used herein, the term "query density value" refers to a value that is programmatically generated based on the query density within a geographic area. In one embodiment, a query density value of a geographic area is programmatically generated by dividing a collected total amount of geographic queries received in the past within a geographic area by the geographic area.

As used here, the term "relevancy value" refers to a value that is programmatically generated based on distance, tolerance, or relevance between the coordinates data comprised in the geographic query and the subset of the coordinates data set associated with the cell actor. In embodiments, a higher relevancy value may be generated if the comparison shows a close distance, a smaller tolerance of distance, or higher relevancy of the merchants that are associated with the two coordinates data.

As used herein, the term "latitude-longitude pair" refers to a pair of values that are programmatically generated to represent a geographic location on the plane of a geographic coordinate system. In one embodiment, the latitude value may be in decimal degrees format and range from −90 to 90 and the longitude value may be in decimal degrees format and range from −180 to 180.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more computing entities. Additionally or alternatively, the computing entity may include fixed computing devices, such as a personal computer or a computer workstation. Still further, example embodiments may be embodied by any of a variety of mobile devices, mobile telephone, smartphone, laptop computer, tablet computer, wearable, or any combination of the aforementioned devices.

Example System Architecture

FIG. 1 illustrates an exemplary logical design diagram of an actor-based geographic search network 100 configured to practice embodiments of the present disclosure. Computing entities may access an actor-based geographic search system 115 via a communications network 102 (e.g., the Internet, LAN, WAN, or the like) using computing entities 101A-101N. The actor-based geographic search system 115 may comprise at least a server 107 in communication with one or more databases or repositories 108, 109.

The server 107 may be embodied as a computer or computers as known in the art. The server 107 may be provided for receiving of electronic data from various sources, including but not necessarily limited to the computing entities 101A-101N. For example, the server 107 may be operable to receive geographic queries transmitted by the computing entities 101A-101N. The server 107 may facilitate the generation and providing of various geographic search responses comprising digital content objects.

The databases or repositories 108-109 may be embodied as a data storage device such as a Network Attached Storage (NAS) device or devices, or as a separate database server or servers. The databases 108-109 include information accessed and stored by the server 107 to facilitate the operations of the actor-based geographic search system 115. For example, the databases 108-109 may include, without limitation, quadrant instance coordinates data sets, cell actor coordinates data sets, and/or the like.

Quadrant instance coordinates data set repository 108 may include a plurality of quadrant instance coordinates data sets. In embodiments, each quadrant instance coordinates data set refers to a coordinates data set associated with a quadrant instance covering a collected or distributed geographic area within an associated quadrant.

Cell actor coordinates data set repository 109 may include a plurality of cell actor coordinates data sets. In embodiments, each cell actor coordinates data set refers to a coordinates data set associated with a cell actor that is associated a quadrant instance. In such embodiments, cell actor coordinates data set covers a geographic entity representing a smaller region or a collection of distributed geographic points within the geographic area that the quadrant instance coordinates data set covers within the associated quadrant.

The server 107 may further comprise a quadrant instance set generator 104 that is configured to generate quadrant instance sets associated with respective quadrants. The server 107 may further comprise a cell actor set generator 105 that is configured to generate cell actor sets associated with respective quadrant instance sets. The server 107 may further comprise an aggregated geographic response generator 106 that is configured to generate aggregated geographic responses based on geographic response sets received from respective cell actor sets.

The computing entities 101A-101N may be any computing entity as defined above. Electronic data received by the server 107 from the computing entities 101A-101N may be provided in various forms and via various methods. For example, the computing entities 101A-101N may include networked devices, such as a server or other network entity, or client devices, such as desktop computers, laptop computers, smartphones, netbooks, tablet computers, wearables, and the like.

In embodiments where a computing entity 101A-101N is a mobile device, such as a smart phone or tablet, the computing entity 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

The computing entity 101A-101N may be a networked device that provide service for client devices to interact with the system 115 via a web browser. As yet another example, the computing entity 101A-101N may include various hardware or firmware designed to interface with the system 115.

It will be appreciated that repositories 108-109 may be one or more repositories, and may be part of or separate from server 107.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, and actor-based geographic search system circuitry 203. The actor-based geographic search system circuitry 203 may further include an aggregator module 206, a cell actor module 207, a router module 208 and a quadrant manager module 209. The apparatus 200 may be configured to execute the operations described above with respect to FIG. 1 and below with respect to FIGS. 3-9. Although these components 201-209 are described with respect to functional limitations, it should be understood that the particular implementations necessarily include the use of particular hardware. It should also be understood that certain of these components 201-209 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, or the like. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Actor-based geographic search system circuitry 203 includes hardware configured to conduct geographic search in response to geographic queries. The actor-based geographic search system circuitry may utilize processing circuitry, such as the processor 202, to perform these actions. However, it should also be appreciated that, in some embodiments, the actor-based geographic search system circuitry may include a separate processor, specially configured field programmable gate array (FPGA), or application specific interface circuit (ASIC) for performing the functions described herein. Circuitry 203 may be implemented using hardware components of the apparatus configured by either hardware or software for implementing these planned functions.

In embodiments, an actor-based geographic search system circuitry 203 includes an aggregator module 206, a cell actor module 207, a router module 208, and a quadrant manager module 209. Upon receiving a geographic query from a computing entity, the quadrant manager module 209 may determine a quadrant covering POI coordinates data comprised in the geographic query. After a quadrant is selected, the aggregator module 206 is configured to forward the geographic query to the cell actor module 207 for delegating geographic search computation tasks to multiple cell actors. The forwarding of the geographic query from aggregator module 206 may be completed through the router module 208 to forward the geographic query to the cell actor module 207.

In embodiments, the aggregator module 206 is configured to receive geographic queries from computing entities. Upon receiving a geographic query, the quadrant manager module 209 may select a quadrant, determine a quadrant instance set associated with the quadrant, and select an initial quadrant instance among the quadrant instance set. After the initial quadrant instance is selected, the initial aggregator module 206 may transmit the geographic query directly to or via router module 208 to cell actor module 207 for conducing multiple geographic search by multiple cell actors. After receiving all the geographic responses from cell actors associated with the aggregator and determining there are all negative results, the aggregator module 206 may broaden or increase the search level/breadth of the geographic search to subsequent quadrant instances representing geographic areas that are adjacent to or broader than the original geographic represented by the initial quadrant instance.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3A illustrates an exemplary embodiment for conducting rapid geographic search in an actor-based geographic search network according to one embodiment of the present disclosure. The depicted actor-based geographic search system 115 receives a geographic query 301 from a computing entity 101A via the communications network 102. The geographic query is received by an aggregator (not shown in FIG. 3) of the actor-based geographic search system 115. In embodiments, the geographic query may comprise POI coordinates data associated with a POI. The POI coordinates data may comprise a latitude-longitude pair, which is denoted by (lat, lng) in FIG. 3. For example, the geographic query 301 may comprise POI coordinates data that includes a latitude-longitude pair of (28.5383° N, 81.3792° W) as illustrated in FIG. 3A.

Upon receiving the geographic query 301, a quadrant manager (not shown in FIG. 3) of the actor-based geographic search system 115 determines, based on the POI coordinates data, a quadrant set 302-303 covering the POI. The quadrant manager of the actor-based geographic search system 115 may further select a quadrant from the quadrant set 302-303 based on a predetermined rules set. For example, a quadrant may be selected from the quadrant set 302-303 based on a query density value. In such an example, the quadrant 303 may be selected from the quadrant set 302-303 because the quadrant 303 is associated with the largest query density value among the quadrant set 302-303.

After the quadrant 303 is selected, the quadrant manager of the actor-based geographic search system 115 may determine a quadrant instance set 304-305 associated with the quadrant 303. In embodiments, the quadrant instance set 304-305 associated with the quadrant 303 may be predefined by the actor-based geographic search system and determined based on a total redemption value associated with each quadrant instance of the quadrant instance set. In embodiments, each quadrant instance of the quadrant instance set 304-305 may comprise a quadrant instance coordinates data set (each illustrated as a table in FIGS. 3A and 3B comprising coordinates data set associated with a collection of geographic points) representing a geographic area (collected or distributed) within the associated quadrant 303. The quadrant manager of the actor-based geographic search system 115 may further select an initial quadrant instance 304 from the quadrant instance set 304-305, where the initial quadrant instance 304 comprises an initial quadrant instance coordinates data set representing an initial geographic area (collected or distributed) within the associated quadrant 303. In embodiments, the initial quadrant instance 303 may be selected from the quadrant instance set 304-305 based on a predetermined rules set. For example, a quadrant instance with the highest total redemption value may be selected from the quadrant instance set 304-305 as the initial quadrant instance 304. In such an example, the initial quadrant instance 304 selected with the highest total redemption value may reflect a respective geographic area having the highest population density.

FIG. 3B illustrates an exemplary embodiment of the association of quadrant instance coordinate data sets and respective cell actor sets according to one embodiment of the present disclosure. Each quadrant instance of the quadrant instance set may comprise a quadrant instance coordinates data set (each illustrated as a table in FIGS. 3A and 3B comprising coordinates data set associated with a collection of geographic points). Each table of the coordinates data set may be mapped to an aggregated or a distributed collection of geographic points that is associated with an aggregator, a router, and a cell actor set. Following FIG. 3A, after the initial quadrant instance 304 is selected, the geographic query 301 may be forwarded (denoted by solid lines in FIG. 3B) by an aggregator $A_1$ to an initial cell actor set (denoted by $C_1$ in FIG. 3) associated with the initial quadrant instance 304. In the depicted embodiment, each initial cell actor of the initial cell actor set $C_1$ is associated with a respective initial cell actor coordinates data set. The respective initial cell actor coordinates data set is a respective subset of the initial quadrant instance coordinates data set representing a respective geographic entity of the initial collected or distributed geographic area.

In some embodiments, the initial quadrant instance 304 associated with an aggregator $A_1$ may further be associated with an initial router $R_1$. In such embodiments, the geographic query 301 may be forwarded by the aggregator $A_1$ to the initial cell actor set $C_1$ via the initial router $R_1$.

In the exemplary embodiment, an initial geographic response set may be received (denoted by dashed lines in FIG. 3B) by the aggregator from the initial cell actor set $C_1$ in response to the geographic query 301. In embodiments, each initial geographic response of the initial geographic response set is generated by the initial cell actor set $C_1$ in parallel based on determining whether the POI coordinates data is included in or relevant to the respective initial cell actor coordinates data set associated with a respective initial cell actor. In embodiments, a positive response may be generated if the POI coordinates data is determined to be included in or relevant to the respective initial cell actor coordinates data. A negative response may be generated if the POI coordinates data is determined to be not included in or not relevant to the respective initial cell actor coordinates data. For example, as illustrated in FIG. 3B, the POI coordinated data of (28.5383° N, 81.3792° W) is not included or relevant to the table of initial cell actor coordinates data associated with the initial quadrant instance 304, thus, a negative response will be generated.

After the initial geographic response set is received from the initial cell actor set $C_1$, the aggregator $A_1$ of the actor-based geographic search system 115 may generate an aggregated geographic response based at least on the initial geographic response set. In embodiments, a mismatch response may be generated if the initial geographic response set includes all negative responses. A match response may be generated if the initial geographic response set does not include all negative responses.

In other embodiments, in circumstances where the initial geographic response set includes all negative responses or not completed responses, the actor-based geographic search system 115 may further determine to forward the geographic query to a subsequent quadrant instance cell actor set $C_2$ associated with a subsequent quadrant instance 305306. In such embodiments, the subsequent quadrant instance 305306 may comprise a subsequent quadrant instance coordinates data set representing a subsequent geographic area (collected or distributed) that is adjacent to or broader than the initial geographic area represented by the initial quadrant instance coordinates data set. In such embodiments, each subsequent cell actor of the subsequent cell actor set $C_2$ is associated with a respective subsequent cell actor coordinates data set. In such embodiments, the respective subsequent cell actor coordinates data set is a respective subset of the subsequent quadrant instance coordinates data set representing a respective geographic entity of the subsequent geographic area.

In embodiments, the subsequent quadrant instance 305 may further be associated with a subsequent aggregator $A_2$ and a subsequent router $R_2$. In embodiments, the geographic query 301 may be forwarded by the aggregator $A_1$ to the subsequent cell actor set $C_2$ via the initial router $R_1$ bypassing the subsequent aggregator $A_2$ and then via the subsequent router $R_2$. In another embodiment, the geographic query 301 may be received, by the subsequent aggregator $A_2$, from the aggregator $A_1$ and be forwarded to the subsequent cell actor set $C_2$ via the subsequent router $R_2$. In both embodiments, the initial quadrant instance 304 may further be associated with an aggregator identifier. In such embodiments, the geographic query 301 forwarded to the subsequent cell actor set $C_2$ may further comprise the aggregator identifier. The aggregator identifier may serve as a reference indicating that the aggregator $A_1$ is forwarding the geographic query 301 for receiving the subsequent geographic response set. In such embodiments, each subsequent cell actor of the subsequent cell actor set $C_2$ may transmit a respective subsequent geographic response directly to the initial aggregator $A_1$ in response to the geographic query 301, where the geographic query 301 may comprise the aggregator identifier as a reference.

In such embodiments, a subsequent geographic response set may be received (denoted by dashed lines in FIG. 3) by the aggregator $A_1$ from the subsequent cell actor set $C_2$ in response to the geographic query 301. In embodiments, each subsequent geographic response of the subsequent geographic response set is generated by the subsequent cell actor set in parallel based on determining whether the POI coordinates data is included in or relevant to the respective subsequent cell actor coordinates data set associated with a respective subsequent cell actor. In embodiments, a positive response may be generated if the POI coordinates data is determined to be included in or relevant to the respective subsequent cell actor coordinates data. A negative response may be generated if the POI coordinates data is determined to be not included in or not relevant to the respective subsequent cell actor coordinates data. For example, as illustrated in FIG. 3B, the POI coordinated data of (28.5383° N, 81.3792° W) is included or relevant to the table of subsequent cell actor coordinates data associated with the subsequent quadrant instance 305, thus, a positive response will be generated.

After the subsequent geographic response set is received from the subsequent cell actor set $C_2$, the aggregator $A_1$ of the actor-based geographic search system 115 may generate an aggregated geographic response based on the initial geographic response set received from the initial cell actor set $C_1$ and the subsequent geographic response set received from the subsequent cell actor set $C_2$. In embodiments, a mismatch response may be generated if the initial geographic response set and the subsequent geographic response set include all negative responses. A match response may be generated if the initial geographic response set and the subsequent geographic response set do not include all negative responses.

FIG. 4 illustrates a signal diagram for conducting rapid geographic search in an actor-based geographic search network according to one embodiment of the present disclosure.

The method 400 begins with receiving a geographic query from a computing entity by an aggregator 401. In the exemplary process, the geographic query comprises POI coordinates data associated with a POI. The POI coordinates data may comprise a latitude-longitude pair associated with the POI. In some embodiments, the POI coordinates data is Cartesian coordinates data or GPS coordinates data. In some embodiments, the geographic query comprising the POI coordinates data associated with the POI is received by the aggregator from the computing entity, wherein the POI is a redeemable geographic location where a provider offers a redeemable promotion accessible to a user associated with the computing entity. In such embodiments, the geographic query transmitted by the computing entity for searching a provider's geographic location to redeem a promotion provided by the provider. The geographic query is being received by the actor-based geographic search system disclosed herein for conducting a rapid geographic search. After the geographic search is conducted and a provider search result is generated, a geographic response may be forwarded back to the computing entity initiating the geographic query. A user using the computing entity may, based on the geographic query received, know providers providing redeemable promotions based on the POI coordinated data the user is interested in and entered into the geographic search system.

The method 400 continues by transmitting the POI coordinates data to the quadrant manager from the aggregator 402 and determining a quadrant set covering the POI based on the POI coordinates data by the quadrant manager 403.

The example method 400 continues by selecting a quadrant from the quadrant set by the quadrant manager 404. The quadrant may be selected by the quadrant manager based on a predetermined rules set. In some embodiments, the predetermined rules set is associated with a query density value.

The method 400 continues by determining a quadrant instance set associated with the quadrant by the quadrant manager 405. In the exemplary process, each quadrant instance of the quadrant instance set comprises a quadrant instance GPS coordinates data set representing a collected or distributed geographic area. In the exemplary process, each quadrant instance of the quadrant instance set is associated with a respective cell actor set. In some embodiments, the quadrant instance set associated with the quadrant may be determined by the quadrant manager based on a predetermined rules set. For example, the quadrant instance set associated with the quadrant may be determined based on a total redemption value associated with each quadrant instance of the quadrant instance set.

The method 400 continues with selecting an initial quadrant instance from the quadrant instance set by the quadrant manager 406. In the exemplary process, the initial quadrant instance comprises an initial quadrant instance coordinates data set representing an initial collected or distributed geographic area. The initial quadrant instance is selected by the quadrant manager from the quadrant instance set based on a predetermined rules set. In some embodiments, a quadrant instance associated with a highest total redemption value may be selected from the quadrant instance set as the initial quadrant instance.

The method 400 continues with forwarding the geographic query to an initial cell actor set associated with the initial quadrant instance by the aggregator in association with the quadrant manager 407. In the exemplary process, each initial cell actor of the initial cell actor set is associated with a respective initial cell actor coordinates data set. The respective initial cell actor coordinates data set is a respective subset of the initial quadrant instance coordinates data set that represents a respective geographic entity of the initial collected or distributed geographic area.

The method 400 continues by receiving, by the aggregator from the initial cell actor set, an initial geographic response set in response to the geographic query 408. In the exemplary process, each initial geographic response of the initial geographic response set is generated by the initial cell actor set in parallel based on determining whether the POI coordinates data is included in or relevant to the respective initial cell actor coordinates data set associated with a respective initial cell actor. In embodiments, each initial geographic response of the initial geographic response set may be generated by each initial cell actor in parallel according to the exemplary process illustrated in FIG. 5.

The method 400 continues with generating, by the aggregator, an aggregated geographic response based at least on the initial geographic response set received from the initial cell actor set 409. In embodiments, the aggregated geographic response may be generated by the aggregator solely based on the initial geographic response set received from the initial cell actor set, according to the exemplary process illustrated in FIG. 6. In other embodiments, the aggregated geographic response may be generated by the aggregator based on the initial geographic response set received from the initial cell actor set and the subsequent geographic response set received from the subsequent cell actor set, according to the exemplary processes illustrated in FIGS. 7-9. In such embodiments, the subsequent cell actor set may be associated with a subsequent quadrant instance, where the subsequent quadrant instance comprises a subsequent quadrant instance coordinates data set representing a subsequent collected or distributed geographic area. In such embodiments, the subsequent collected or distributed geographic area may be adjacent to or broader than the initial geographic area represented by the initial quadrant instance coordinates data set.

The method 400 concludes by transmitting the aggregated geographic response from the aggregator to the computing entity 410.

FIG. 5 illustrates an exemplary process for generating each initial geographic response of an initial geographic response set according to one embodiment of the present disclosure.

The method 500 begins with determining whether the POI coordinates data is included in or relevant to the respective initial cell actor coordinates data set associated with the respective initial cell actor 501.

In circumstances where the POI coordinates data is determined to be included in or relevant to the respective initial cell actor coordinates data set associated with the respective initial cell actor, the method 500 continues by generating, by the respective initial cell actor, an initial geographic response as a positive response 502.

In circumstances where the POI coordinates data is determined to be not included in or not relevant to the respective initial cell actor coordinates data set associated with the respective initial cell actor, the method 500 continues by generating, by the respective initial cell actor, an initial geographic response as a negative response 503.

FIG. 6 illustrates an exemplary process for generating an aggregated geographic response by the aggregator based on the initial geographic response set according to one embodiment of the present disclosure. The method 600 begins by determining whether the initial geographic response set received from the initial cell actor set includes all negative responses 601.

In circumstances where the initial geographic response set received from the initial cell actor set includes all negative responses, the method 600 continues with generating the aggregated geographic response as a mismatch response by the aggregator 602.

In circumstances where the initial geographic response set received from the initial cell actor set does not include all negative responses, the method 600 continues with generating the aggregated geographic response as a match response by the aggregator 603 via aggregating all the received responses and determining the best response with the received data.

FIG. 7 illustrates a signal diagram for generating an aggregated geographic response based at least on the initial geographic response set according to one embodiment of the present disclosure. The method of 700 follows step 408 after the initial geographic response set generated by the initial cell actor is received by the aggregator as described in FIG. 4. After the aggregator receives the initial geographic response set, the aggregator may generate the aggregated geographic response based on the method 700.

The method 700 begins with determining whether the initial geographic response set received from the initial cell actor set includes all negative responses. In circumstances where the initial geographic response set received from the initial cell actor set does not include all negative responses, a math response would be generated as the aggregated geographic response. And the aggregated geographic response is transmitted from the aggregator to the computing entity as illustrated as the final step 410 in FIG. 4 or FIG. 7.

In circumstances where the initial geographic response set received from the initial cell actor set includes all negative responses 701, the method 700 continues with forwarding the geographic query from the aggregator to a subsequent cell actor set associated with a subsequent quadrant instance 702. In the exemplary process, the subsequent quadrant instance comprises a subsequent quadrant instance coordinates data set. The subsequent quadrant instance coordinates data set represents a subsequent collected or distributed geographic area adjacent to or broader than the initial geographic area represented by the initial quadrant instance coordinates data set. In the exemplary process, each subsequent cell actor of the subsequent cell actor set is associated with a respective subsequent cell actor coordinates data set. The respective subsequent cell actor coordinates data set is a respective subset of the subsequent quadrant instance coordinates data set representing a respective geographic entity of the subsequent collected or distributed geographic area.

Following step 702, the method 700 continues with receiving, by the aggregator from the subsequent cell actor set, a subsequent geographic response set in response to the geographic query 703. In the exemplary process, each subsequent geographic response of the subsequent geographic response set is generated by the subsequent cell actor set in parallel based on determining whether the POI coordinates data is included in or relevant to the respective subsequent cell actor coordinates data set associated with a respective subsequent cell actor. In embodiments, each subsequent geographic response of the subsequent geographic response set may be generated by each subsequent cell actor in parallel according to the exemplary process illustrated in FIG. 8.

Following step 703, the method 700 continues with generating, by the aggregator, the aggregated geographic response based on the initial geographic response set received from the initial cell actor set and the subsequent geographic response set received from the subsequent cell actor set 704. In embodiments, the aggregated geographic response may be generated by the aggregator based on the initial geographic response set received from the initial cell actor set and the subsequent geographic response set received from the subsequent cell actor set, according to the exemplary process illustrated in FIG. 9.

FIG. 8 illustrates an exemplary process for generating each subsequent geographic response of a subsequent geographic response set according to one embodiment of the present disclosure.

The method 800 begins with determining whether the POI coordinates data is included in or relevant to the respective subsequent cell actor coordinates data set associated with the respective subsequent cell actor 801.

In circumstances where the POI coordinates data is determined to be included in or relevant to the respective subsequent cell actor coordinates data set associated with the respective subsequent cell actor, the method 800 continues with generating, by the respective subsequent cell actor, a subsequent geographic response as a positive response 802.

In circumstances where the POI coordinates data is determined to be not included in or not relevant to the respective subsequent cell actor coordinates data set associated with the respective subsequent cell actor, the method 800 continues with generating, by the respective subsequent cell actor, a subsequent geographic response as a negative response 803.

FIG. 9 illustrates an exemplary process for generating an aggregated geographic response by the aggregator based on the initial geographic response set and the subsequent geographic response set according to one embodiment of the present disclosure.

The method 900 begins with determining whether the initial geographic response set received from the initial cell actor set and the subsequent geographic response set received from the subsequent cell actor set include all negative responses 901.

In circumstances where the initial geographic response set received from the initial cell actor set and the subsequent geographic response set received from the subsequent cell actor set include all negative responses, the method 900 continues with generating the aggregated geographic response as a mismatch response by the aggregator 902.

In circumstances where the initial geographic response set received from the initial cell actor set and the subsequent geographic response set received from the subsequent cell actor set do not include all negative responses, the method 900 continues with generating the aggregated geographic response as a match response by the aggregator 903.

In embodiments, the initial quadrant instance may further be associated with an aggregator identifier. In such embodiments, the geographic query forwarded to the subsequent cell actor set in method 700 may further comprise the aggregator identifier. The aggregator identifier may serve as a reference indicating which aggregator is forwarding the geographic query for receiving the subsequent geographic response set. In such embodiments, each subsequent cell actor of the subsequent cell actor set may transmit a respective subsequent geographic response directly to the aggregator in response to the geographic query, where the geographic query may comprise the aggregator identifier as a reference.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for rapid geographic search, the apparatus comprising at least one processor and at least one memory including computer program code, the at least one memory and the computer program code configured to, with the at least one processor, cause the apparatus to:
receive, from a computing entity, a geographic query comprising point of interest (POI) coordinates data;
determine, by a quadrant manager, a quadrant set based on the POI coordinates data;
select, by the quadrant manager, a quadrant from the quadrant set;
determine, by the quadrant manager, a quadrant instance set associated with the quadrant, each quadrant instance of the quadrant instance set comprising a quadrant instance coordinates data set;
select, by the quadrant manager, an initial quadrant instance from the quadrant instance set, the initial quadrant instance comprising an initial quadrant instance coordinates data set;
receive, by the aggregator from an initial cell actor set, an initial geographic response set in response to the geographic query, wherein each initial geographic response of the initial geographic response set is generated by the initial cell actor set in parallel based on determining whether the POI coordinates data is included in or relevant to a respective initial cell actor coordinates data set associated with a respective initial cell actor;
generate, by the aggregator, an aggregated geographic response based at least on the initial geographic response set received from the initial cell actor set; and
transmit, from the aggregator, an electronic message based on the aggregated geographic response to the computing entity.

2. The apparatus of claim 1, wherein the at least one processor and the at least one memory including the computer program code, the at least one memory and the computer program code configured to, with the at least one processor, further cause the apparatus to:
in a circumstance where the POI coordinates data is determined to be included in or relevant to the respective initial cell actor coordinates data set associated with the respective initial cell actor:
generate, by the respective initial cell actor, the initial geographic response as a positive response; and
in a circumstance where the POI coordinates data is determined to be not included in or not relevant to the respective initial cell actor coordinates data set associated with the respective initial cell actor:
generate, by the respective initial cell actor, the initial geographic response as a negative response.

3. The apparatus of claim 2, wherein the at least one processor and the at least one memory including the computer program code, the at least one memory and the computer program code configured to, with the at least one processor, further cause the apparatus to:
in a circumstance where the initial geographic response set received from the initial cell actor set includes all negative responses:
generate, by the aggregator, the aggregated geographic response as a mismatch response; and
in a circumstance where the initial geographic response set received from the initial cell actor set does not include all negative responses:
generate, by the aggregator, the aggregated geographic response as a match response.

4. The apparatus of claim 2, wherein the at least one processor and the at least one memory including the computer program code, the at least one memory and the computer program code configured to, with the at least one processor, further cause the apparatus to:
in a circumstance where the initial geographic response set received from the initial cell actor set includes all negative responses:
forward, by the aggregator, the geographic query to a subsequent cell actor set associated with a subsequent quadrant instance, the subsequent quadrant instance comprising a subsequent quadrant instance coordinates data set representing a subsequent collected or distributed geographic area adjacent to or broader than a collected or distributed geographic area represented by the initial quadrant instance coordinates data set, each subsequent cell actor of the subsequent cell actor set associated with a respective subsequent cell actor coordinates data set;
receive, by the aggregator, from the subsequent cell actor set, a subsequent geographic response set in response to the geographic query, wherein each subsequent geographic response of the subsequent geographic response set is generated by the subsequent cell actor set in parallel based on determining whether the POI coordinates data is included in or relevant to the respective subsequent cell actor coordinates data set associated with a respective subsequent cell actor; and generate, by the aggregator, the aggregated geographic response based on the initial geographic response set received from the initial cell actor set and the subsequent geographic response set received from the subsequent cell actor set.

5. The apparatus of claim 4, wherein the at least one processor and the at least one memory including the computer program code, the at least one memory and the computer program code configured to, with the at least one processor, further cause the apparatus to:

in a circumstance where the POI coordinates data is determined to be included in or relevant to the respective subsequent cell actor coordinates data set associated with the respective subsequent cell actor:

generate, by the respective subsequent cell actor, a subsequent geographic response as a positive response; and in a circumstance where the POI coordinates data is determined to be not included in or not relevant to the respective subsequent cell actor coordinates data set associated with the respective subsequent cell actor:

generate, by the respective subsequent cell actor, the subsequent geographic response as a negative response.

6. The apparatus of claim 5, wherein the at least one processor and the at least one memory including the computer program code, the at least one memory and the computer program code configured to, with the at least one processor, further cause the apparatus to:

in a circumstance where the initial geographic response set received from the initial cell actor set and the subsequent geographic response set received from the subsequent cell actor set include all negative responses:

generate, by the aggregator, the aggregated geographic response as a mismatch response; and in a circumstance where the initial geographic response set received from the initial cell actor set and the subsequent geographic response set received from the subsequent cell actor set do not include all negative responses:

generate, by the aggregator, the aggregated geographic response as a match response.

7. The apparatus of claim 1, wherein the aggregator is further associated with an aggregator identifier, and wherein each geographic response received by the aggregator further comprises the aggregator identifier.

8. The apparatus of claim 1, wherein the POI coordinates data are associated with a POI that is a is a redeemable geographic location where a provider offers a redeemable promotion accessible to a user associated with the computing entity.

9. The apparatus of claim 1, wherein each quadrant instance coordinates data set represents a collected or distributed geographic area.

10. The apparatus of claim 9, wherein the collected or distributed geographic area is a geographic location, a plurality of geographic locations, a neighborhood, a local region, a division, a zipcode area, a city, a county, a state, or a country.

11. A method for rapid geographic search, the method comprising:

receiving, from a computing entity, a geographic query comprising point of interest (POI) coordinates data;

determining, by a quadrant manager, a quadrant set based on the POI coordinates data;

selecting, by the quadrant manager, a quadrant from the quadrant set;

determining, by the quadrant manager, a quadrant instance set associated with the quadrant, each quadrant instance of the quadrant instance set comprising a quadrant instance coordinates data set;

selecting, by the quadrant manager, an initial quadrant instance from the quadrant instance set, the initial quadrant instance comprising an initial quadrant instance coordinates data set;

receiving, by the aggregator from an initial cell actor set, an initial geographic response set in response to the geographic query, wherein each initial geographic response of the initial geographic response set is generated by the initial cell actor set in parallel based on determining whether the POI coordinates data is included in or relevant to a respective initial cell actor coordinates data set associated with a respective initial cell actor;

generating, by the aggregator, an aggregated geographic response based at least on the initial geographic response set received from the initial cell actor set; and transmitting, from the aggregator, an electronic message based on the aggregated geographic response to the computing entity.

12. The method of claim 11, further comprising:

in a circumstance where the POI coordinates data is determined to be included in or relevant to the respective initial cell actor coordinates data set associated with the respective initial cell actor:

generating, by the respective initial cell actor, the initial geographic response as a positive response; and in a circumstance where the POI coordinates data is determined to be not included in or not relevant to the respective initial cell actor coordinates data set associated with the respective initial cell actor:

generating, by the respective initial cell actor, the initial geographic response as a negative response.

13. The method of claim 12, further comprising:

in a circumstance where the initial geographic response set received from the initial cell actor set includes all negative responses:

generating, by the aggregator, the aggregated geographic response as a mismatch response; and in a circumstance where the initial geographic response set received from the initial cell actor set does not include all negative responses:

generating, by the aggregator, the aggregated geographic response as a match response.

14. The method of claim 12, further comprising:

in a circumstance where the initial geographic response set received from the initial cell actor set includes all negative responses:

forwarding, by the aggregator, the geographic query to a subsequent cell actor set associated with a subsequent quadrant instance, the subsequent quadrant instance comprising a subsequent quadrant instance coordinates data set representing a subsequent collected or distributed geographic area adjacent to or broader than a collected or distributed geographic area represented by the initial quadrant instance coordinates data set, each subsequent cell actor of the subsequent cell actor set associated with a respective subsequent cell actor coordinates data set;

receiving, by the aggregator, from the subsequent cell actor set, a subsequent geographic response set in response to the geographic query, wherein each subsequent geographic response of the subsequent geographic response set is generated by the subsequent cell actor set in parallel based on determining whether the POI coordinates data is included in or relevant to the respective subsequent cell actor coordinates data set associated with a respective subsequent cell actor; and generating, by the aggregator, the aggregated geographic response based on the initial geographic response set received from the initial cell actor set and the subsequent geographic response set received from the subsequent cell actor set.

15. The method of claim 14, further comprising:

in a circumstance where the POI coordinates data is determined to be included in or relevant to the respective subsequent cell actor coordinates data set associated with the respective subsequent cell actor:

generating, by the respective subsequent cell actor, a subsequent geographic response as a positive response; and in a circumstance where the POI coordinates data is determined to be not included in or not relevant to the respective subsequent cell actor coordinates data set associated with the respective subsequent cell actor:

generating, by the respective subsequent cell actor, the subsequent geographic response as a negative response.

16. The method of claim 15, further comprising:

in a circumstance where the initial geographic response set received from the initial cell actor set and the subsequent geographic response set received from the subsequent cell actor set include all negative responses:

generating, by the aggregator, the aggregated geographic response as a mismatch response; and in a circumstance where the initial geographic response set received from the initial cell actor set and the subsequent geographic response set received from the subsequent cell actor set do not include all negative responses:

generating, by the aggregator, the aggregated geographic response as a match response.

17. The method of claim 11, wherein the aggregator is further associated with an aggregator identifier, and wherein each geographic response received by the aggregator further comprises the aggregator identifier.

18. The method of claim 11, wherein the POI coordinates data are associated with a POI that is a is a redeemable geographic location where a provider offers a redeemable promotion accessible to a user associated with the computing entity.

19. The method of claim 11, wherein each quadrant instance coordinates data set represents a collected or distributed geographic area.

20. The method of claim 19, wherein the collected or distributed geographic area is a geographic location, a plurality of geographic locations, a neighborhood, a local region, a division, a zipcode area, a city, a county, a state, or a country.

* * * * *

UNITED STATES PATENT AND TRADEMARK OFFICE
CERTIFICATE OF CORRECTION

PATENT NO. : 12,050,630 B2  
APPLICATION NO. : 18/112801  
DATED : July 30, 2024  
INVENTOR(S) : Matias Sebastian Gonzalez et al.

Page 1 of 1

It is certified that error appears in the above-identified patent and that said Letters Patent is hereby corrected as shown below:

On the Title Page

In Column 1, item (71), Applicant, Line 1, delete "Bytedance, Inc.," and insert -- Bytedance Inc., --, therefor.

In the Claims

In Column 29, Line 56, Claim 8, delete "is a is a" and insert -- is a --, therefor.
In Column 32, Line 19, Claim 18, delete "is a is a" and insert -- is a --, therefor.

Signed and Sealed this  
Twenty-sixth Day of November, 2024

Katherine Kelly Vidal  
*Director of the United States Patent and Trademark Office*